United States Patent
Feist et al.

(10) Patent No.: US 8,746,969 B2
(45) Date of Patent: Jun. 10, 2014

(54) DETERMINING THERMAL HISTORY OF COMPONENTS

(75) Inventors: Jörg Peter Feist, London (GB); John Rayment Nicholls, Buckinghamshire (GB); Andrew Lawrence Heyes, London (GB)

(73) Assignee: Sensor Coating Systems Limited, Surrey (GB)

( * ) Notice: Subject to any disclaimer, the term of this patent is extended or adjusted under 35 U.S.C. 154(b) by 883 days.

(21) Appl. No.: 12/811,260

(22) PCT Filed: Dec. 31, 2008

(86) PCT No.: PCT/GB2008/004300
§ 371 (c)(1), (2), (4) Date: Dec. 3, 2010

(87) PCT Pub. No.: WO2009/083729
PCT Pub. Date: Jul. 9, 2009

(65) Prior Publication Data
US 2011/0069735 A1     Mar. 24, 2011

(30) Foreign Application Priority Data
Dec. 31, 2007 (GB) .................................. 0725380.0

(51) Int. Cl.
 G01K 3/00 (2006.01)
 G01K 11/00 (2006.01)
(52) U.S. Cl.
 USPC .......................................... 374/102; 374/161
(58) Field of Classification Search
 USPC .................. 374/1, 141, 144; 427/357, 435, 8; 60/754
See application file for complete search history.

(56) References Cited

U.S. PATENT DOCUMENTS

| | | | |
|---|---|---|---|
| 4,749,856 A * | 6/1988 | Walker et al. | 250/227.11 |
| 4,825,447 A | 4/1989 | Bramhall | |
| 5,008,136 A | 4/1991 | Chamberlain | |
| 6,383,570 B1 * | 5/2002 | Bose et al. | 427/405 |
| 6,434,267 B1 | 8/2002 | Smith | |
| 6,974,249 B1 | 12/2005 | Fair et al. | |
| 6,974,641 B1 * | 12/2005 | Choy et al. | 428/704 |
| 7,005,015 B2 * | 2/2006 | Burgel et al. | 148/428 |

(Continued)

FOREIGN PATENT DOCUMENTS

| EP | 0930488 | 1/1999 |
|---|---|---|
| EP | 1288266 | 8/2002 |

(Continued)

OTHER PUBLICATIONS

Yuexiao Pan, Mingmei Wu, Qiang Su, "Comparative investigation of synthesis and photoluminescence of YAG:Ce phosphor", Materials Science and Engineering B 106 (2004) 251-256.*

(Continued)

*Primary Examiner* — Lisa Caputo
*Assistant Examiner* — Nasir U Ahmed
(74) *Attorney, Agent, or Firm* — Renner, Otto, Boisselle & Sklar, LLP

(57) ABSTRACT

A system for and method of determining thermal history of components which are subjected to high-temperature environments, such as in boilers, fuel cells, furnaces, engines and gas turbines, and temperature-monitoring materials and coatings for use in such a system and method.

35 Claims, 18 Drawing Sheets

(56) References Cited

U.S. PATENT DOCUMENTS

| | | | |
|---|---|---|---|
| 7,445,434 B2 * | 11/2008 | Harada et al. | 416/241 R |
| 7,858,952 B2 * | 12/2010 | Feist et al. | 250/459.1 |
| 2003/0043881 A1 | 3/2003 | Hodgkinson | |
| 2003/0044986 A1 | 3/2003 | Watson | |
| 2003/0044987 A1 | 3/2003 | Watson et al. | |
| 2003/0049467 A1 | 3/2003 | Watson et al. | |
| 2003/0049847 A1 | 3/2003 | Watson et al. | |
| 2009/0017260 A1 * | 1/2009 | Kulkarni et al. | 428/472.2 |
| 2009/0085176 A1 * | 4/2009 | Couillard et al. | 257/655 |

FOREIGN PATENT DOCUMENTS

| | | |
|---|---|---|
| EP | 1288267 | 8/2002 |
| EP | 1291393 | 8/2002 |
| EP | 1291394 | 8/2002 |
| EP | 1291395 | 8/2002 |
| EP | 1614724 | 6/2005 |
| GB | 1103059 | 2/1967 |
| GB | 2204874 | 5/1987 |
| JP | 2005-281353 | 10/2005 |
| WO | 92/09870 | 6/1992 |
| WO | 00/06796 | 2/2000 |
| WO | 2007/023293 | 3/2007 |

OTHER PUBLICATIONS

International Search Report for corresponding application No. PCT/GB2008/004300 dated May 6, 2009.

* cited by examiner

DETERMINING THERMAL HISTORY OF COMPONENTS

The present invention relates to a system for and method of determining thermal history of components which are subjected to high-temperature environments, such as in boilers, fuel cells, furnaces, engines and gas turbines, and temperature-monitoring materials and coatings for use in such a system and method.

It is important to be able to monitor the thermal history of components which are subjected to high-temperature environments, in particular at an ambient temperature, which requires that the measured characteristic is irreversible.

One existing system is the measurement of the thickness of a thermally-grown oxide, which is a function of temperature and exposure time. The measurement of the thickness in combination with a pre-calibrated look-up table enables a determination of the temperature to which the object has been exposed when the exposure time is known.

However, structural changes of such kind require destructive testing, notably cutting and polishing, expensive equipment, and the investigations are usually laborious and so not very practical, particularly when development times need to be reduced to a minimum.

Coatings which change colour or are otherwise physically changed at a given temperature are known to be useful in monitoring temperature profiles or gradients to which components have been subjected. These coatings applied as paints have some advantages, such as allowing for non-destructive monitoring, are relatively low cost and can provide temperature profiles across a larger area in contrast to discrete point measurements.

Such coatings are known as temperature-indicating paints, thermal paints, irreversible temperature-indicating paints or colour-changing paints and are described, for example, in U.S. Pat. No. 6,434,267, U.S. Pat. No. 5,008,136, US-A-2003/0043881, US-A-2003/0049847, US-A-2003/0044986, US-A-2003/0044987, US-A-2003/0049467, EP-A-1288266, EP-A-1288267, EP-A-1291393, EP-A-1291394, EP-A-1291395, EP-A-1614724, GB-A-1103059 and GB-A-2204874.

These coatings are usually interpreted manually by eye, as described, for example, in U.S. Pat. No. 6,434,267. The described conventional procedure is time consuming for the human operator, impractical when inaccessible areas are concerned, and highly dependent on the subjective colour reception of the operator, which can be a source of systematic error and requires stringent quality control measures.

U.S. Pat. No. 6,434,267 describes a complex electronic system for interpreting material colour changes in order to extract temperature information. This system removes uncertainty when it comes to predicting the past temperature exposure, but only with significant-added complexity and cost.

It is an aim of the present invention to provide a system for and method of determining thermal history of components which are subjected to high-temperature environments, such as in boilers, fuel cells, furnaces, engines and gas turbines, and temperature-monitoring materials and coatings for use in such a system and method.

It is another aim of the present invention to provide luminescent material compositions which are operative in higher-temperature environments, typically ranging from room temperature to 1300° C. and above, and which can be used to indicate a thermal history or past temperature exposure.

It is a further particular aim of the present invention to provide luminescent material compositions which allow for an indication of thermal history at ambient temperature.

In one aspect the present invention provides a method of determining a thermal history of a component which is subjected to an operative, thermal environment, in particular a high-temperature environment, the method comprising the steps of: providing a detection material to a component, wherein the detection material comprises an amorphous host which is in an amorphous or glassy state prior to exposure to an operative, thermal environment and doped with at least one luminescent dopant; exposing the component to an operative, thermal environment; measuring at least one luminescence characteristic of the detection material following exposure of the component to the operative environment, wherein the at least one luminescence characteristic is a function of the crystallization of the amorphous host of the detection material and the exposure of the component to the operative environment; and determining a thermal history of the component from the measured at least one luminescence characteristic of the detection material.

In another aspect the present invention provides a system for determining a thermal history of a component to which is provided a detection material and which is in use subjected to an operative, thermal environment, wherein the detection material comprises an amorphous host which is in an amorphous or glassy state prior to exposure to the operative environment and doped with at least one luminescent dopant, the system comprising: a detector for measuring at least one luminescence characteristic of the detection material following exposure of the component to the operative environment, wherein the at least one luminescence characteristic is a function of the crystallization of the amorphous host of the detection material and the exposure of the component to the operative environment; and a processor for determining a thermal history of the component from the measured at least one luminescence characteristic of the detection material.

In another aspect the present invention provides a detection material for use in determining a thermal history of a component which is in use subjected to an operative, thermal environment, wherein the detection material comprises an amorphous host which is in an amorphous or glassy state prior to exposure to the operative environment and doped with at least one luminescent dopant, and the detection material has at least one luminescence characteristic which is a function of the crystallization of the amorphous host of the detection material and the exposure of the component to the operative environment.

In another aspect the present invention provides a method of determining a thermal history of a component which is subjected to an operative, thermal environment, in particular a high-temperature environment, the method comprising the steps of: providing a detection material to a component, wherein the detection material comprises a host, which has a first state when never having been exposed to a temperature above a predeterminable temperature and a second, different state once having been exposed to a temperature above the predeterminable temperature, and at least one luminescent dopant; exposing the component to an operative, thermal environment; measuring at least one luminescence characteristic of the detection material following exposure of the component to the operative environment, wherein the at least one luminescence characteristic characterizes the state of the host of the detection material and is a function of the exposure of the component to the operative environment; and determining a thermal history of the component from the measured at least one luminescence characteristic of the detection material.

In another aspect the present invention provides a system for determining a thermal history of a component to which is provided a detection material and which is in use subjected to an operative, thermal environment, wherein the detection material comprises a host, which has a first state when never having been exposed to a temperature above a predeterminable temperature and a second, different state once having been exposed to a temperature above the predeterminable temperature, and at least one luminescent dopant, the system comprising: a detector for measuring at least one luminescence characteristic of the detection material following exposure of the component to the operative environment, wherein the at least one luminescence characteristic characterizes the state of the host of the detection material and is a function of the exposure of the component to the operative environment; and a processor for determining a thermal history of the component from the measured at least one luminescence characteristic of the detection material.

In another aspect the present invention provides a detection material for use in determining a thermal history of a component which is in use subjected to an operative, thermal environment, wherein the detection material comprises a host, which has a first state when never having been exposed to a temperature above a predeterminable temperature and a second, different state once having been exposed to a temperature above the predeterminable temperature, and at least one luminescent dopant, and the detection material has at least one luminescence characteristic which is a function of the state of the host of the detection material and the exposure of the component to the operative environment.

In another aspect the present invention provides a method of determining a thermal history of a component which is subjected to an operative, thermal environment, in particular a high-temperature environment, the method comprising the steps of: providing a detection material to a component, wherein the detection material comprises a host and, separately, at least one luminescent dopant which functions to diffuse into the host when the component is exposed to an operative, thermal environment; exposing the component to an operative, thermal environment; measuring at least one luminescence characteristic of the detection material following exposure of the component to the operative environment, wherein the at least one luminescence characteristic is a function of an extent of diffusion of the at least one luminescent dopant into the host of the detection material and the exposure of the component to the operative environment; and determining a thermal history of the component from the measured at least one luminescence characteristic of the detection material.

In another aspect the present invention provides a system for determining a thermal history of a component to which is provided a detection material and which is in use subjected to an operative, thermal environment, wherein the detection material comprises a host and, separately, at least one luminescent dopant which functions to diffuse into the host when the component is exposed to the operative environment, the system comprising: a detector for measuring at least one luminescence characteristic of the detection material following exposure of the component to the operative environment, wherein the at least one luminescence characteristic is a function of an extent of diffusion of the at least one luminescent dopant into the host of the detection material and the exposure of the component to the operative environment; and a processor for determining a thermal history of the component from the measured at least one luminescence characteristic of the detection material.

In another aspect the present invention provides a detection material for use in determining a thermal history of a component which is in use subjected to an operative, thermal environment, wherein the detection material comprises a host and, separately, at least one luminescent dopant which functions to diffuse into the host when the component is exposed to the operative environment, and the detection material has at least one luminescence characteristic which is a function of an extent of diffusion of the at least one luminescent dopant into the host of the detection material and the exposure of the component to the operative environment.

In another aspect the present invention provides a method of determining a thermal history of a component which is subjected to an operative, thermal environment, in particular a high-temperature environment, the method comprising the steps of: providing a detection material to a component, wherein the detection material comprises a host which is doped with at least one luminescent dopant and, separately, a modifier agent which functions to diffuse into the host when the component is exposed to an operative, thermal environment and thereby alter at least one luminescence characteristic of the detection material; exposing the component to an operative, thermal environment; measuring at least one luminescence characteristic of the detection material following exposure of the component to the operative environment, wherein the at least one luminescence characteristic is a function of the exposure of the component to the operative environment; and determining a thermal history of the component from the measured at least one luminescence characteristic of the detection material.

In another aspect the present invention provides a system for determining a thermal history of a component to which is provided a detection material and which is in use subjected to an operative, thermal environment, wherein the detection material comprises a host which is doped with at least one luminescent dopant and, separately, a modifier agent which functions to diffuse into the host when the component is exposed to the operative environment and thereby alter at least one luminescence characteristic of the detection material, the system comprising: a detector for measuring at least one luminescence characteristic of the detection material following exposure of the component to the operative environment, wherein the at least one luminescence characteristic is a function of the exposure of the component to the operative environment; and a processor for determining a thermal history of the component from the measured at least one luminescence characteristic of the detection material.

In another aspect the present invention provides a detection material for use in determining a thermal history of a component which is in use subjected to an operative, thermal environment, wherein the detection material comprises a host which is doped with at least one luminescent dopant and, separately, a modifier agent which functions to diffuse into the host when the component is exposed to the operative environment and thereby alter at least one luminescence characteristic of the detection material, and the detection material has at least one luminescence characteristic which is a function of the exposure of the component to the operative environment.

The present invention also extends to a coating, such as a paint or a structural coating, for example, a thermal barrier coating (TBC), applied to a component comprising the above-described detection material.

The present invention further extends to a paint for application to a component comprising the above-described detection material.

The present invention still further extends to a component comprising the above-described detection material provided within a body thereof.

One advantage of the present invention is in providing an optical readout process which is both fast and easily performed, consequently enabling inter alia a faster design process.

Another advantage of the present invention over existing temperature-indicating paints is that the present invention does not require the use of toxic metals, such as lead and chromium, or the use of noble metals, such as silver or gold, which provides a significant cost advantage.

Furthermore, in the present invention, the luminescence of the luminescent material can be easily measured with an instrument, such as a camera, a boroscope or a photomultiplier device, which enables the operator to read out the thermal history of the luminescent material when the data is compared with pre-calibrated data.

Preferred embodiments of the present invention will now be described hereinbelow by way of example only with reference to the accompanying drawings, in which.

Figure 3A:
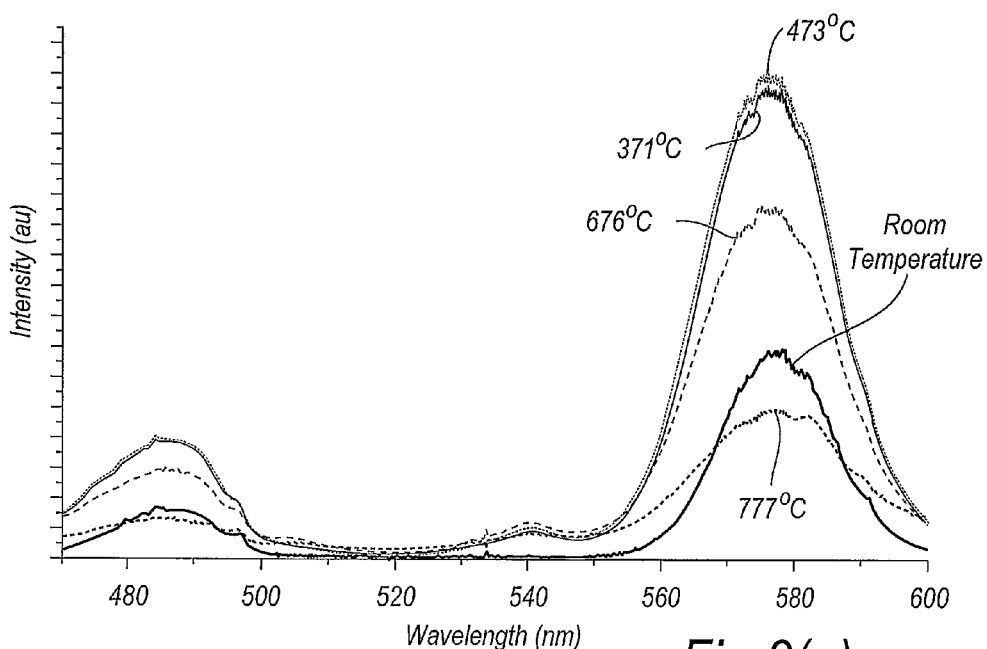
Figure 3B:
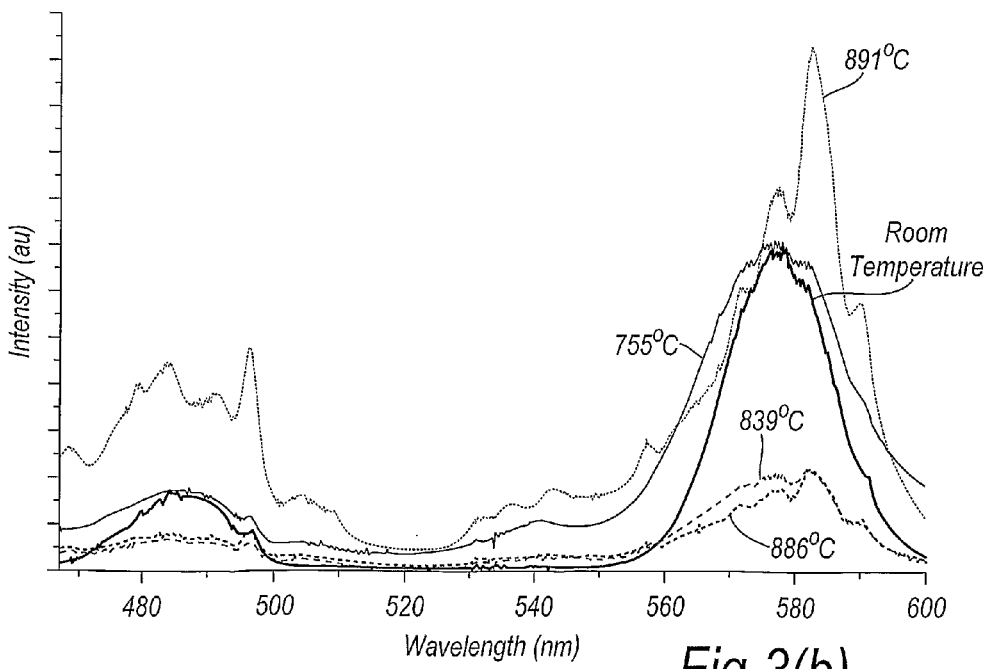
Figure 4:
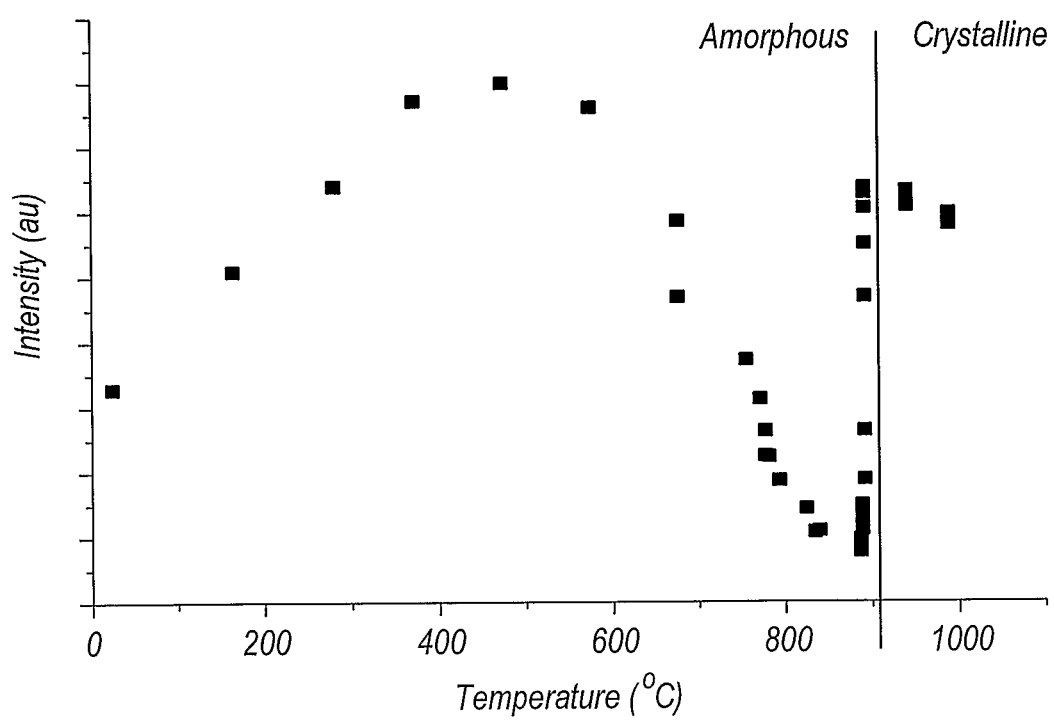
Figure 5:
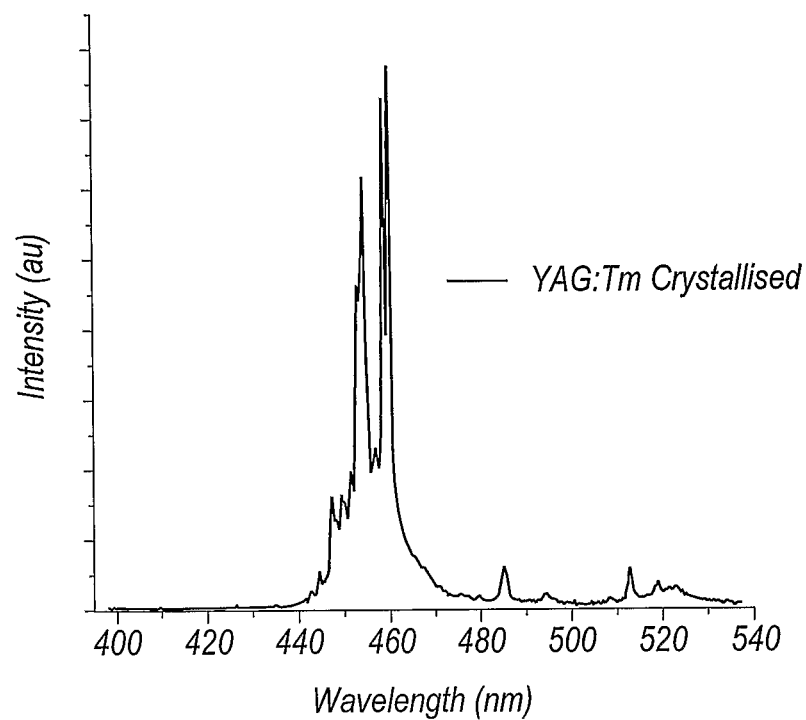
Figure 6:
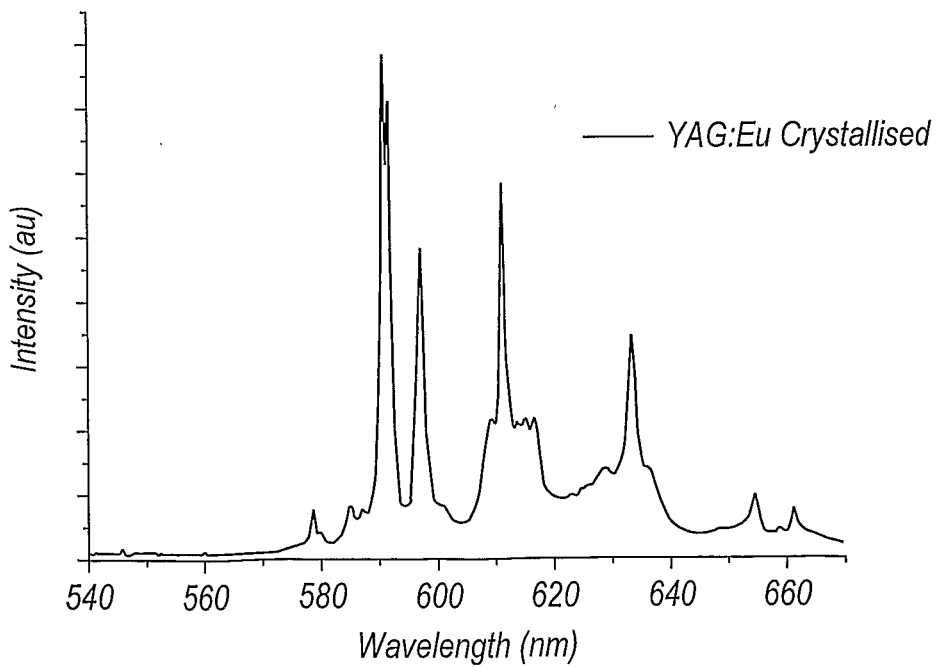
Figure 7:
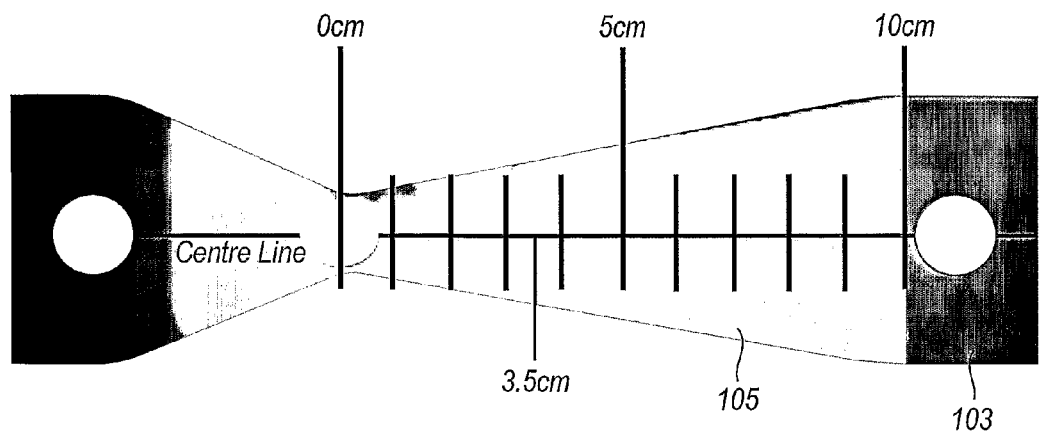
Figure 8A:
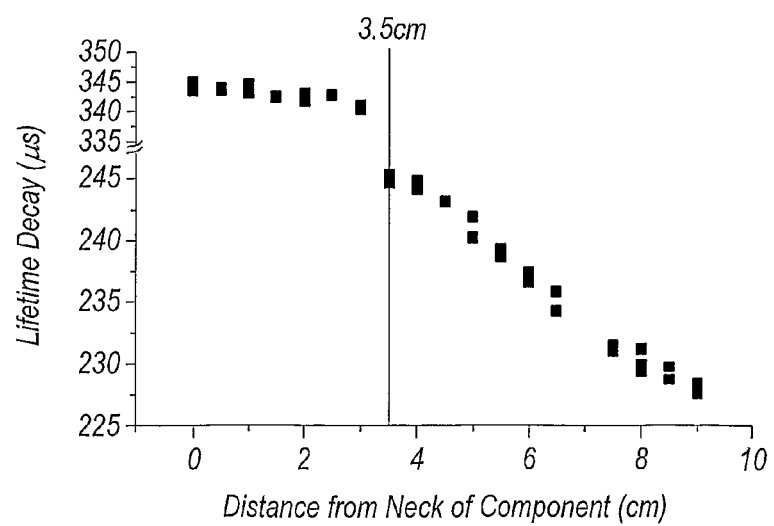
Figure 8B:
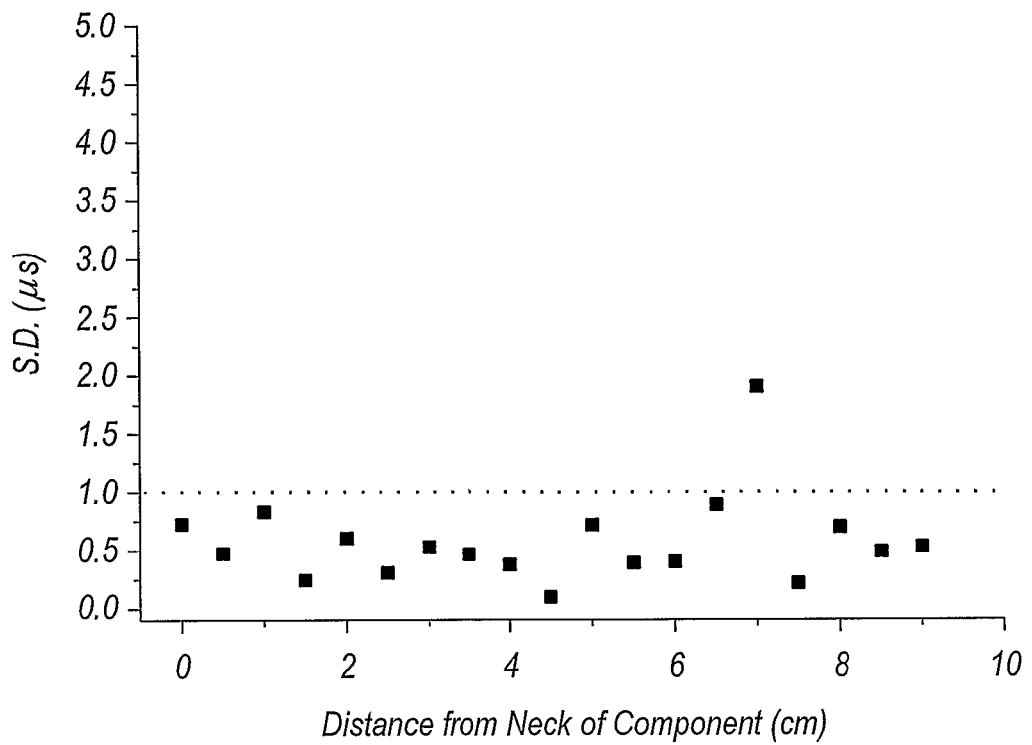
Figure 10:
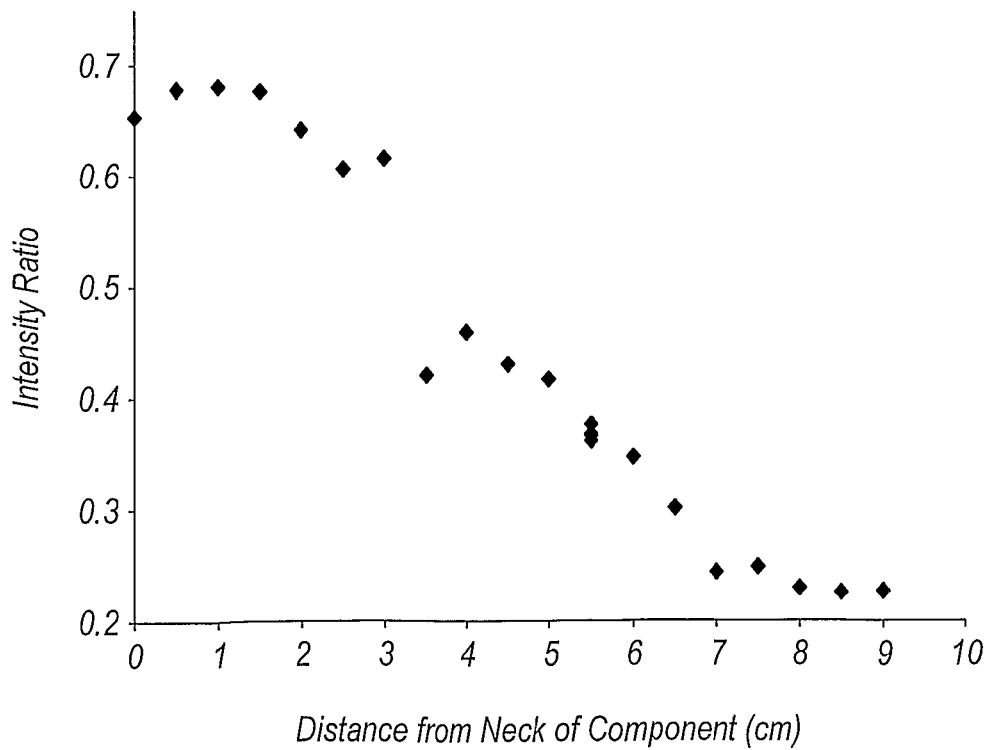
Figure 9:
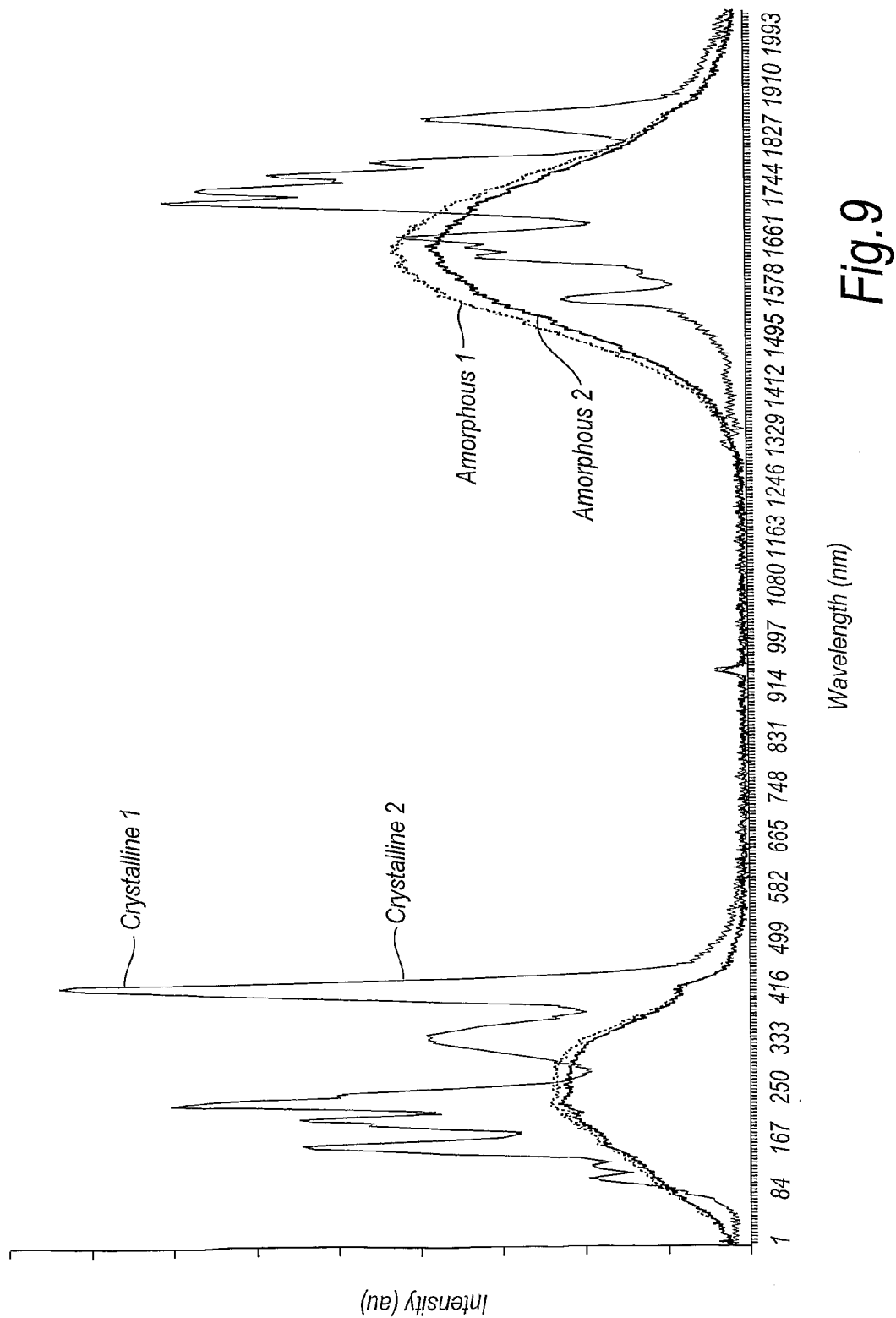
Figure 11:
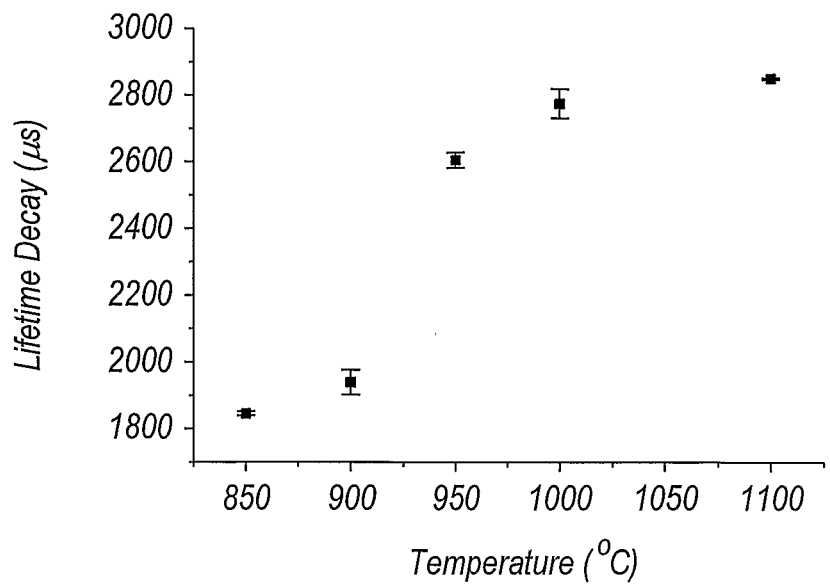
Figure 12:
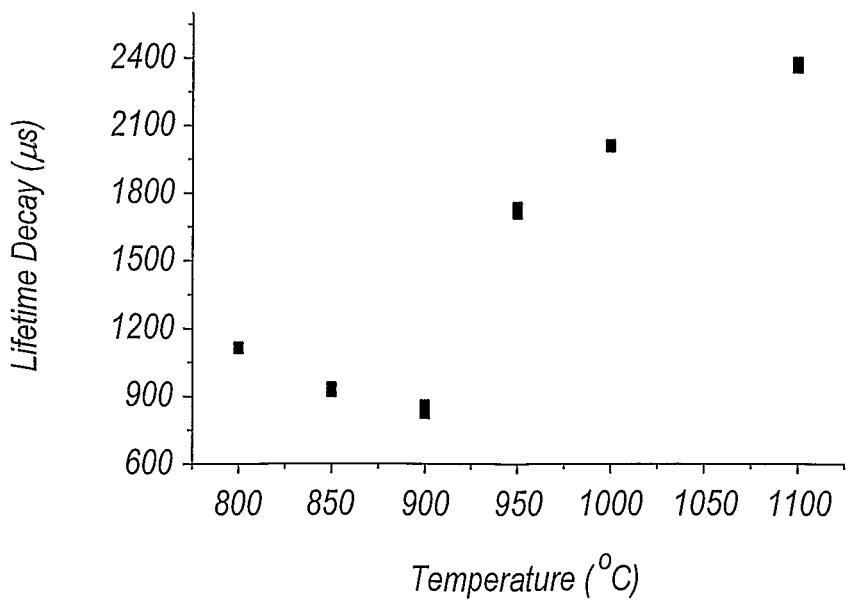
Figure 13:
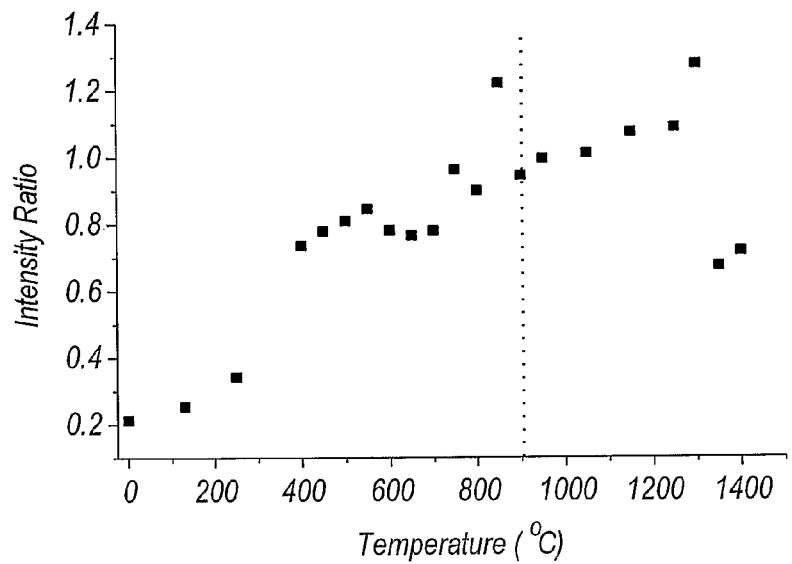
Figure 14:
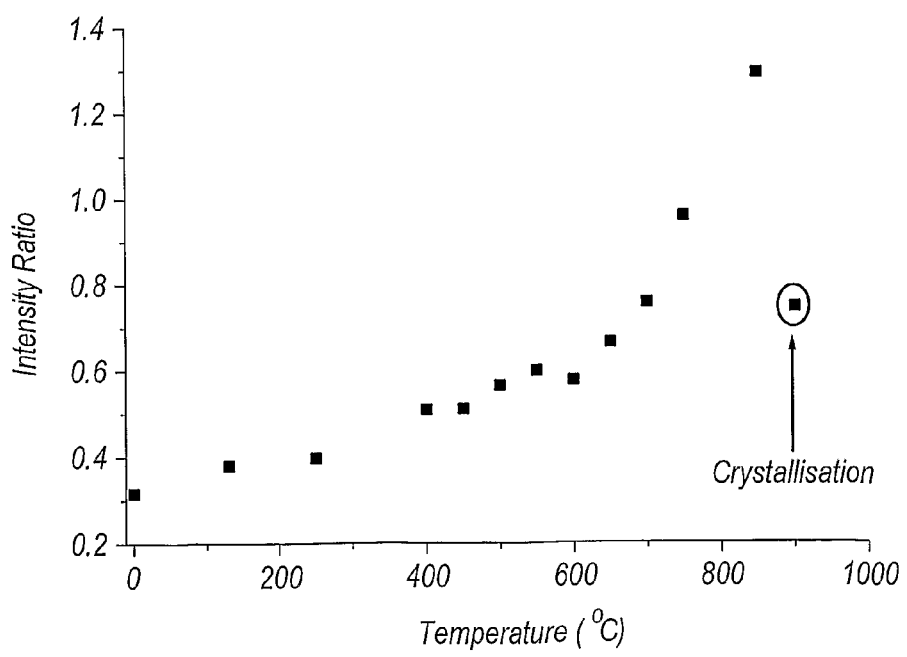
Figure 15:
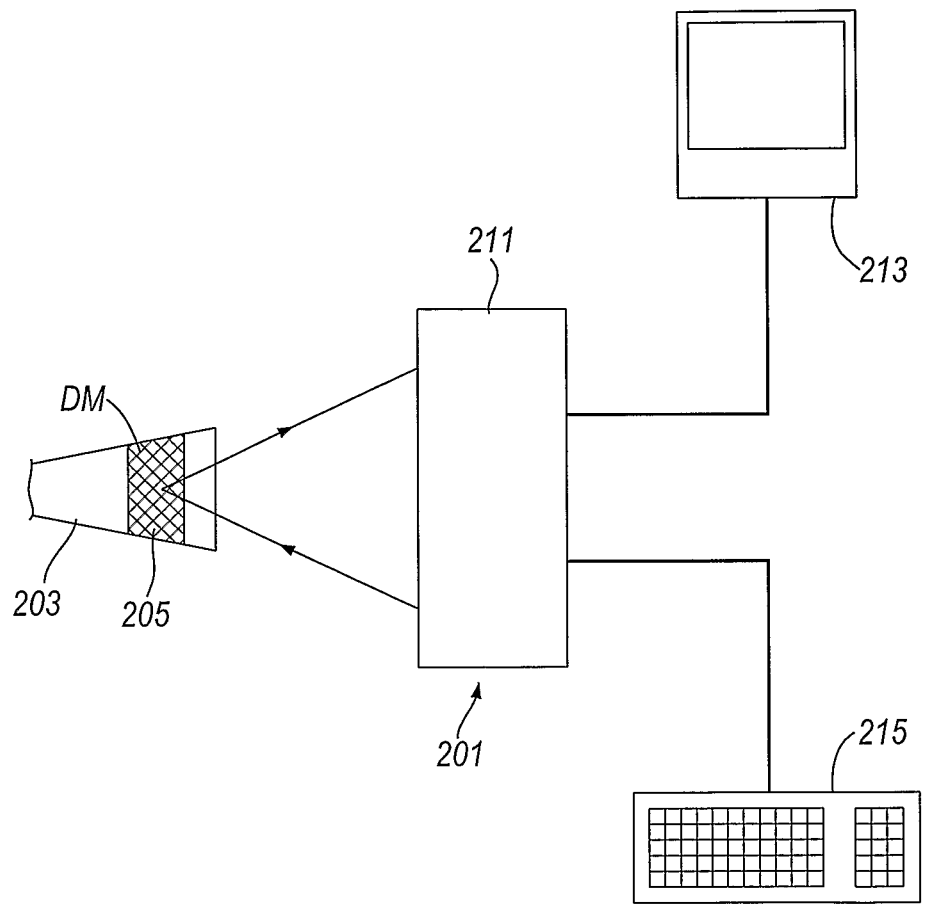
Figure 16:
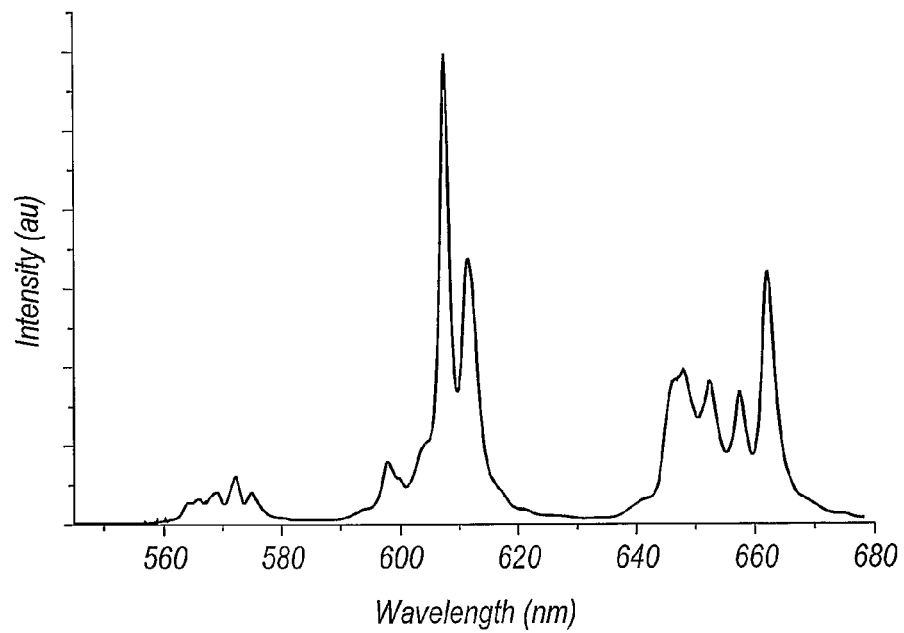
Figure 17:
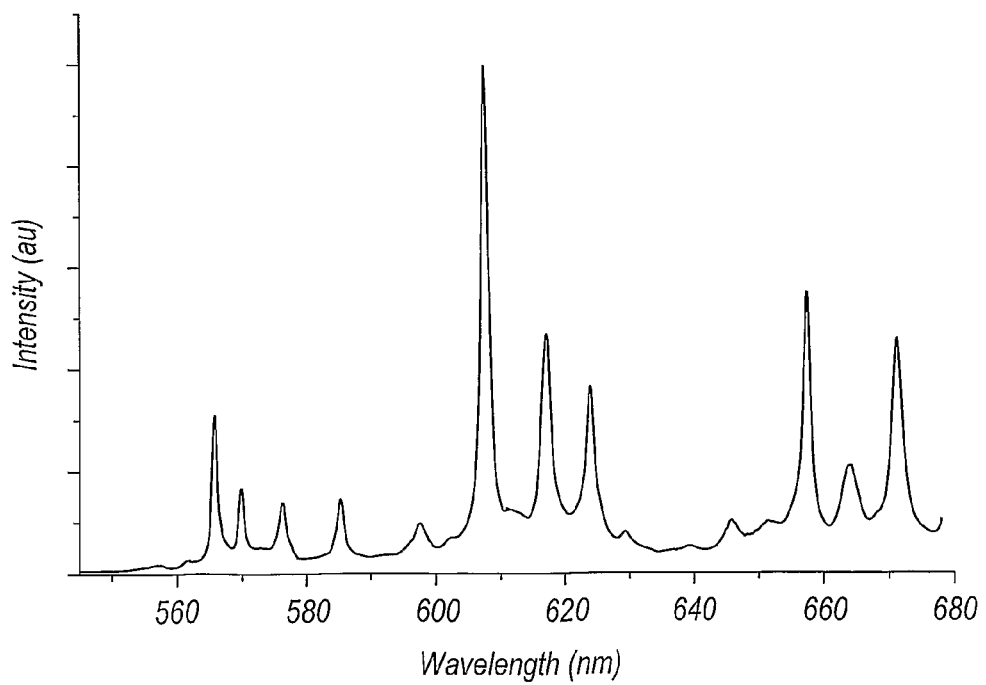
Figure 18:
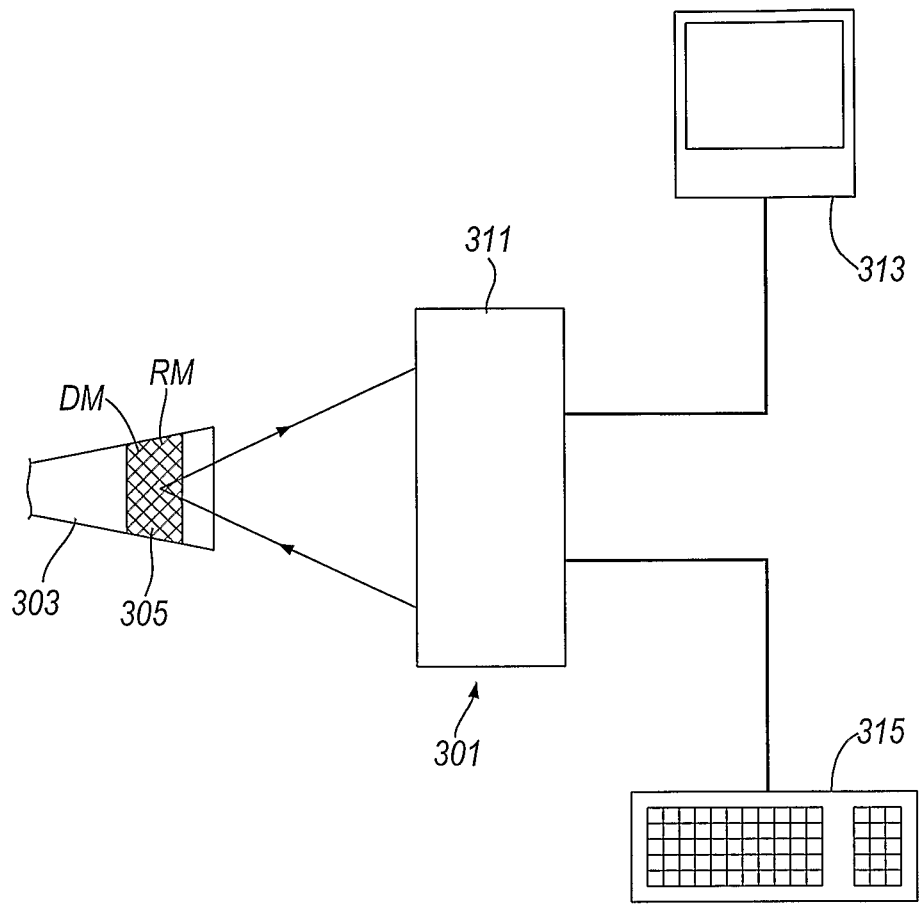
Figure 19:
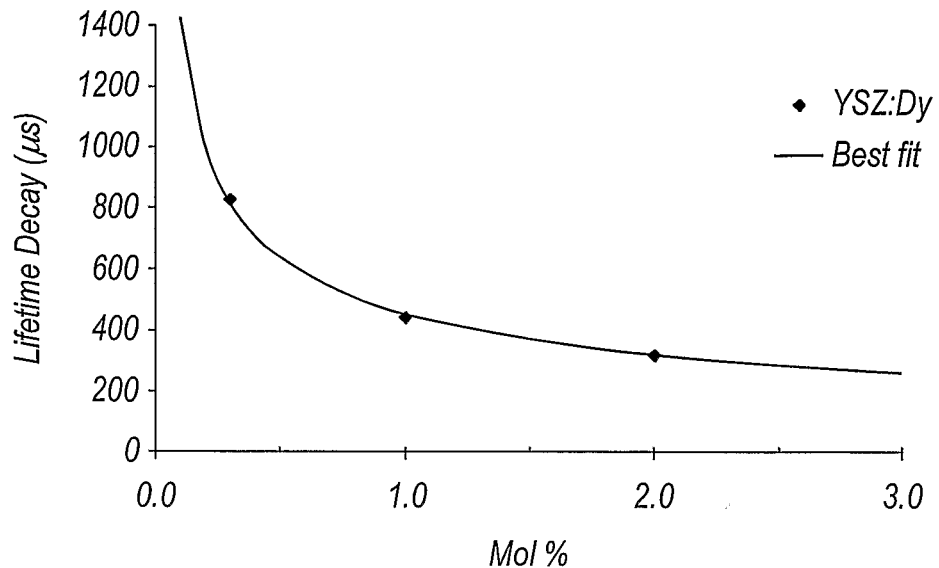
Figure 20:
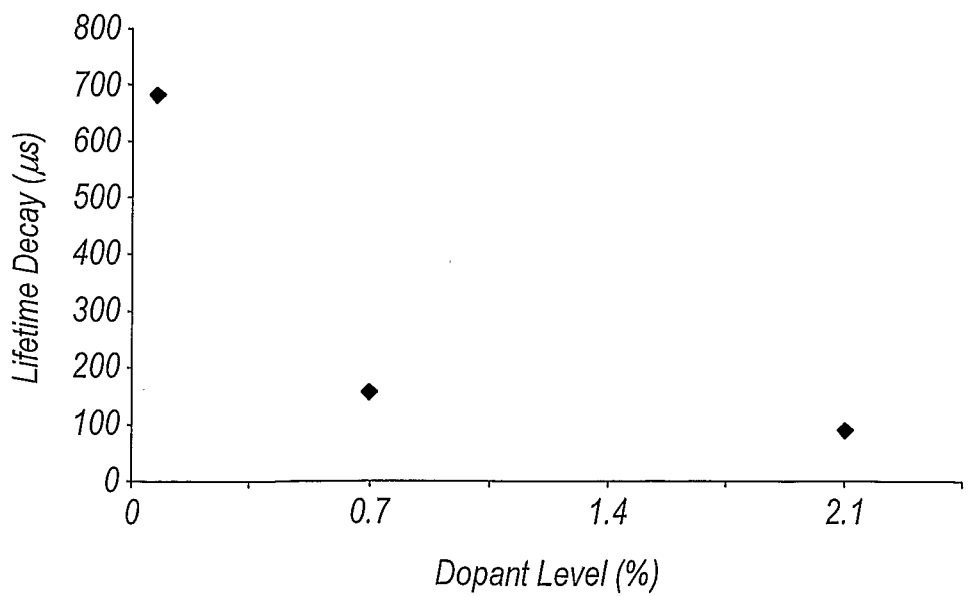
Figure 21:
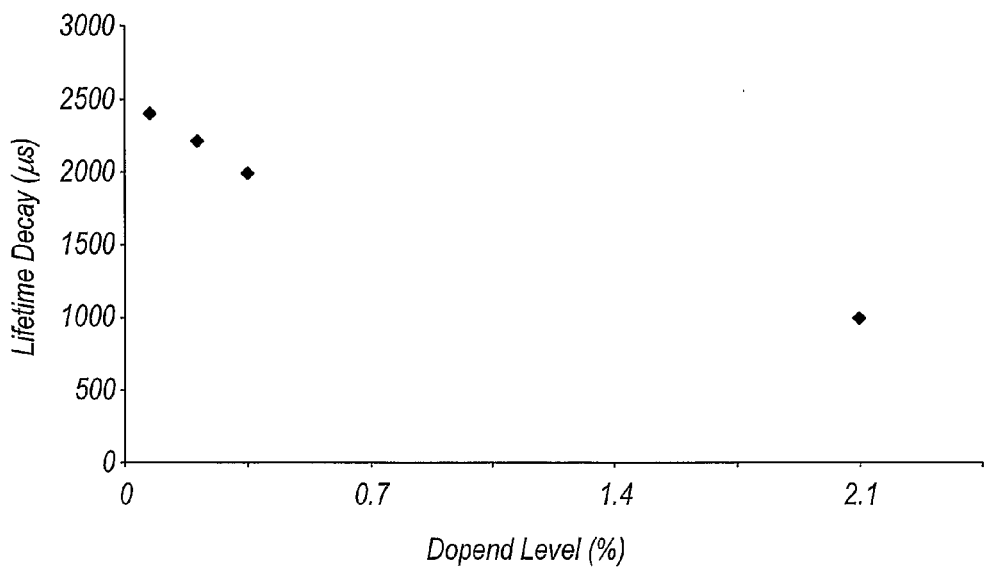
Figure 22:
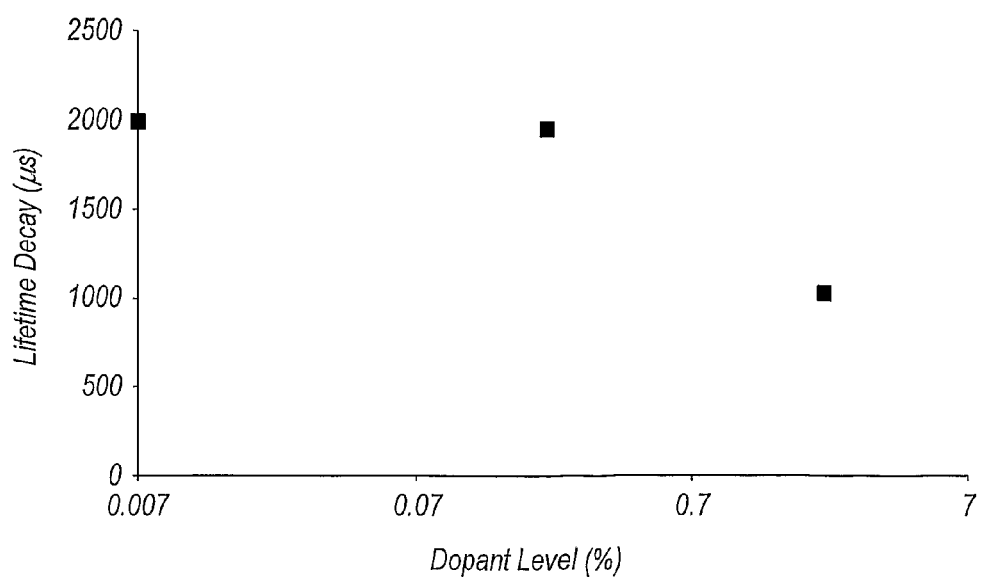
Figure 23:
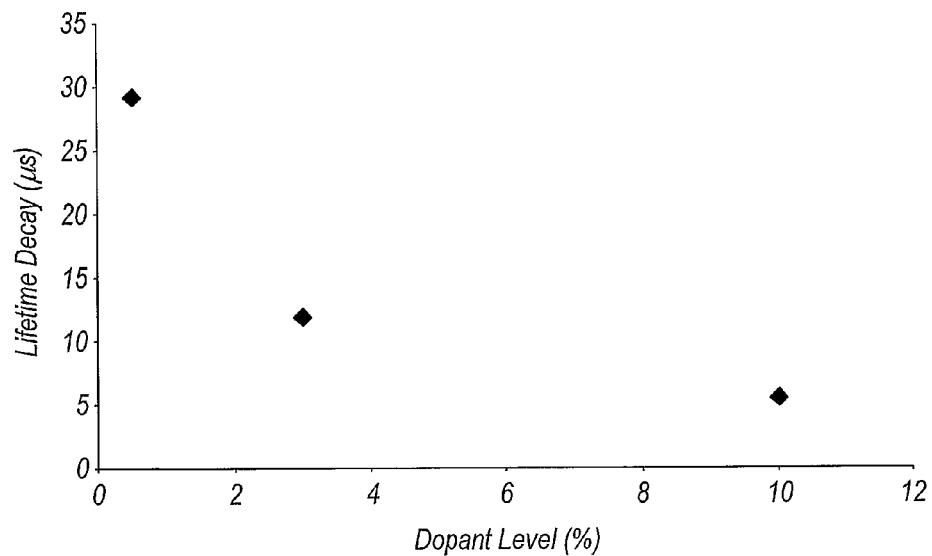
Figure 24:
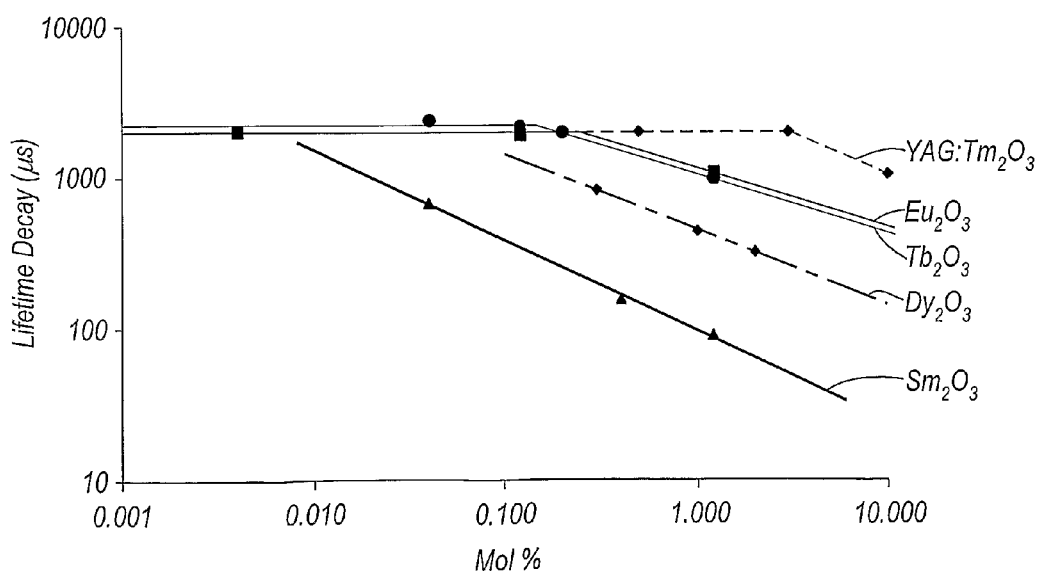
Figure 25:
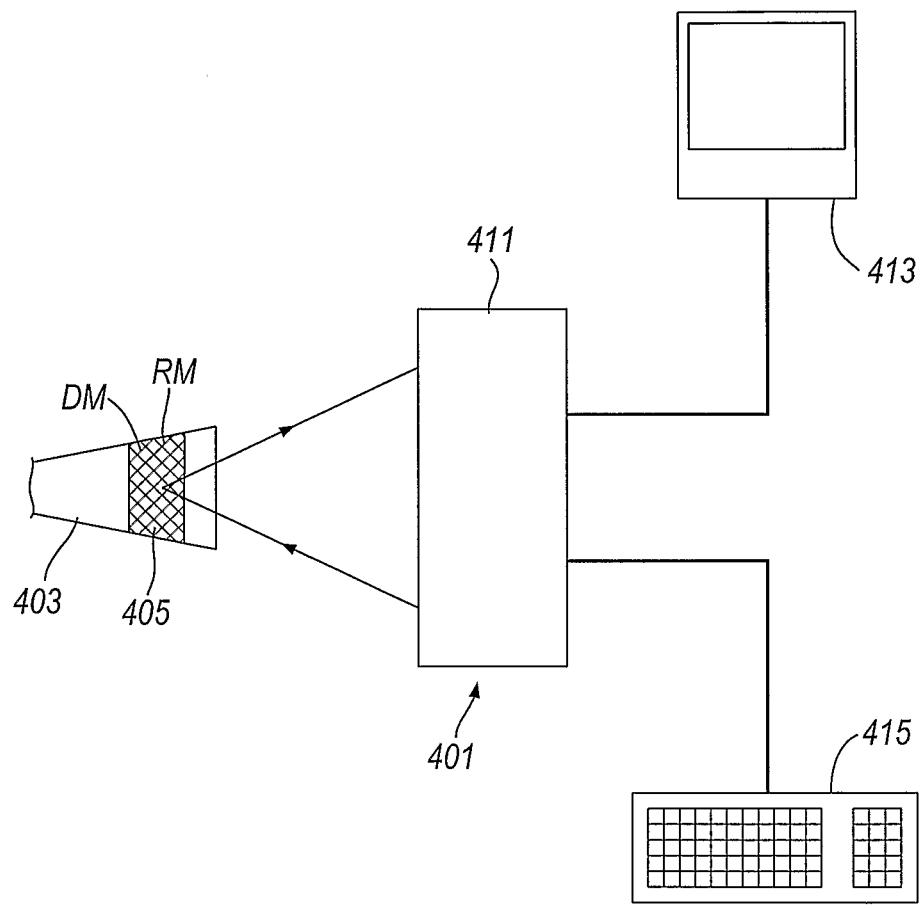
Figure 26:
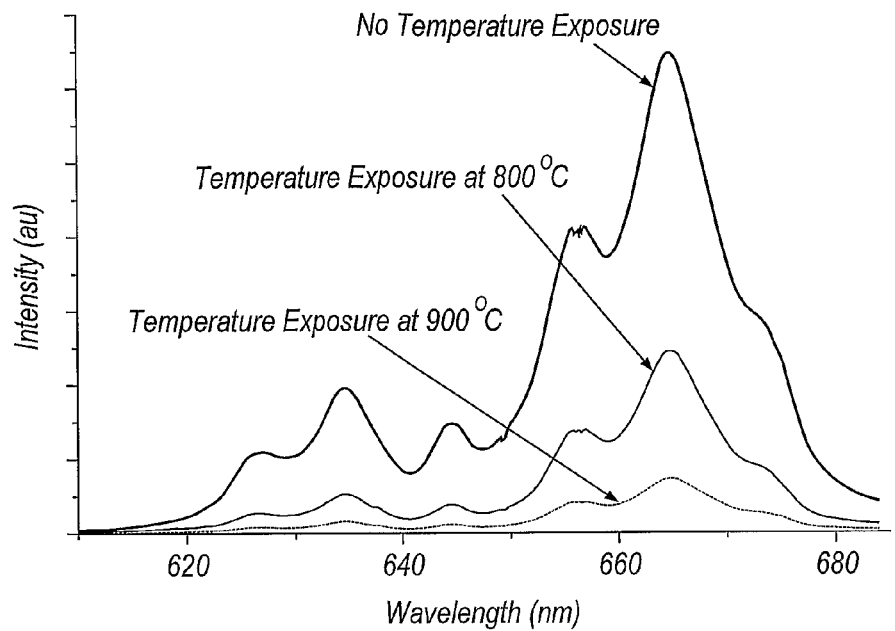
Figure 27:
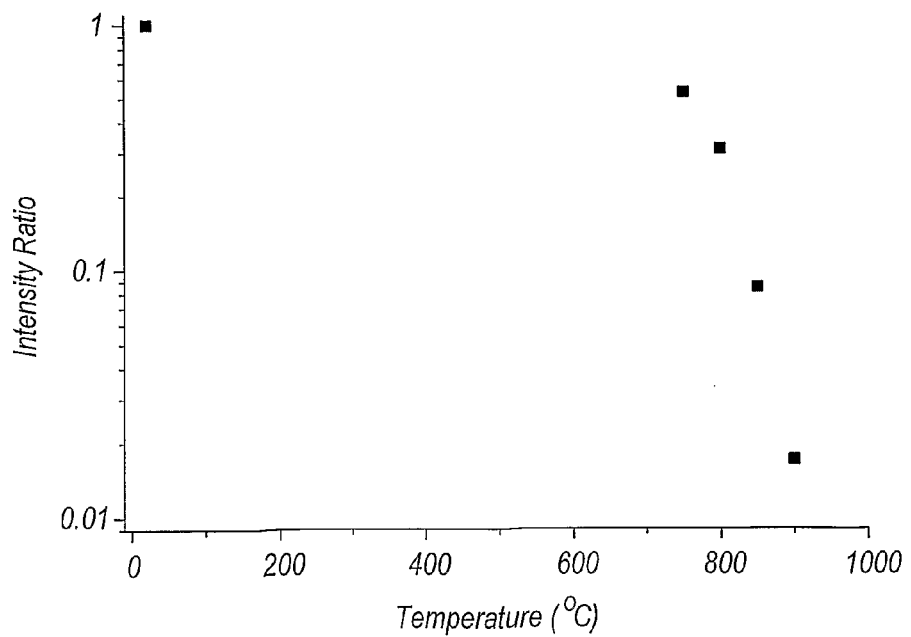
Figure 28:
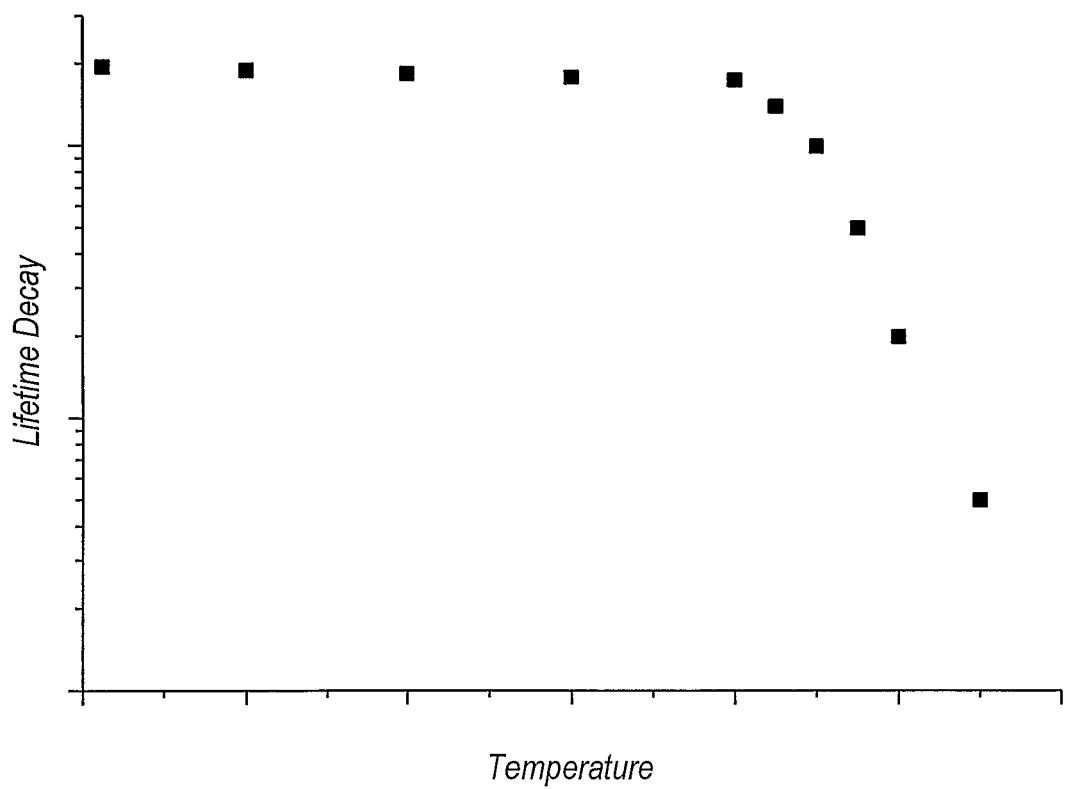

FIGS. 3(a) and (b) illustrate luminescence spectra measured at the various indicated temperatures after excitation with a UV laser light source at a wavelength of 355 nm of a detection material comprising an amorphous yttrium aluminium garnet (YAG) host doped with 3 wt % dysprosia ($Dy_2O_3$) in accordance with Example #1A;

FIG. 4 illustrates the intensity as a function of temperature for the luminescence spectra of FIGS. 3(a) and (b);

FIG. 5 illustrates a luminescence spectrum measured at room temperature after excitation with a UV laser light source at a wavelength of 355 nm of a reference material comprising fully-crystalline yttrium aluminium garnet (YAG) doped with 3 wt % thulia ($Tm_2O_3$) in accordance with Example #1A;

FIG. 6 illustrates a luminescence spectrum measured at room temperature after excitation with a UV laser light source at a wavelength of 355 nm of a reference material comprising fully-crystalline yttrium aluminium garnet (YAG) doped with 3 wt % europia ($Eu_2O_3$) in accordance with Example #1A;

FIG. 7 illustrates a component fabricated with an applied coating of a detection material in accordance with Example #1B;

FIG. 8(a) illustrates the lifetime decay at room temperature after excitation with a UV laser light source at a wavelength of 355 nm of the detection material applied to the component of FIG. 7;

FIG. 8(b) illustrates the standard deviation over the measurement range of the lifetime decay of FIG. 8(a);

FIG. 9 illustrates representative luminescence spectra at room temperature after excitation with a UV laser light source at a wavelength of 355 nm from four positions along the coating applied to the component of FIG. 7;

FIG. 10 illustrates the intensity ratio at room temperature after excitation with a UV laser light source at a wavelength of 355 nm of the detection material at the indicated positions along the length of the long wing of the component of FIG. 7;

FIG. 11 illustrates the lifetime decay at room temperature after excitation with a UV laser light source at a wavelength of 266 nm for samples of a detection material comprising an amorphous yttrium aluminium perovskite (YAP) host doped with 3 wt % terbia ($Tb_2O_3$) in accordance with Example #1C;

FIG. 12 illustrates the lifetime decay at room temperature after excitation with a UV laser light source at a wavelength of 266 nm for samples of a detection material comprising an amorphous yttrium aluminium monoclinic (YAM) host doped with 3 wt % terbia ($Tb_2O_3$) in accordance with Example #1D;

FIG. 13 illustrates the intensity ratio at room temperature after excitation with a UV laser light source at a wavelength of 355 nm for samples of a detection material comprising an amorphous yttrium aluminium garnet (YAG) host doped with 3 wt % dysprosia ($Dy_2O_3$) in accordance with Example #1E;

FIG. 14 illustrates the intensity ratio at room temperature after excitation with a UV laser light source at a wavelength of 355 nm for samples of a detection material comprising an amorphous yttrium aluminium perovskite (YAP) host doped with 3 wt % dysprosia ($Dy_2O_3$) in accordance with Example #1F;

FIG. 15 illustrates a system in accordance with a second embodiment of the present invention for determining a thermal history of a component which is subjected to a high-temperature environment;

FIG. 16 illustrates a luminescence spectrum measured at room temperature after excitation with a UV laser light source at a wavelength of 266 nm of a detection material comprising a $Y_2O_2S$ host doped with 1 wt % samaria ($Sm_2O_3$) when having never been exposed to a temperature above about 1000° C. in accordance with Example #2;

FIG. 17 illustrates a luminescence spectrum measured at room temperature after excitation with a UV laser light source at a wavelength of 266 nm of the detection material of FIG. 16 when having been exposed to a temperature above about 1000° C.;

FIG. 18 illustrates a system in accordance with a third embodiment of the present invention for determining a thermal history of a component which is subjected to a high-temperature environment;

FIG. 19 illustrates the lifetime decay at room temperature after excitation with a UV laser light source at a wavelength of 355 nm for samples of a detection material comprising an yttria stabilized zirconia (YSZ) host doped with terbia ($Tb_2O_3$) in amounts of 0.3 mol %, 1 mol % and 2 mol % in accordance with Example #3A;

FIG. 20 illustrates the lifetime decay at room temperature after excitation with a UV laser light source at a wavelength of 355 nm for samples of a detection material comprising an yttria stabilized zirconia (YSZ) host doped with samaria ($Sm_2O_3$) in amounts of 0.07 wt %, 0.7 wt % and 2.1 wt % in accordance with Example #3B;

FIG. 21 illustrates the lifetime decay at room temperature after excitation with a UV laser light source at a wavelength of 355 nm for samples of a detection material comprising an yttria stabilized zirconia (YSZ) host doped with terbia ($Tb_2O_3$) in amounts of 0.07 wt %, 0.21 wt %, 0.35 wt % and 2.1 wt % in accordance with Example #3C;

FIG. 22 illustrates the lifetime decay at room temperature after excitation with a UV laser light source at a wavelength of 355 nm for samples of a detection material comprising an yttria stabilized zirconia (YSZ) host doped with europia ($Eu_2O_3$) in amounts of 0.007 wt %, 0.21 wt % and 2.1 wt % in accordance with Example #3D;

FIG. 23 illustrates the lifetime decay at room temperature after excitation with a UV laser light source at a wavelength of 355 nm for samples of a detection material comprising an yttrium aluminium garnet (YAG) host doped with thulia ($Tm_2O_3$) in amounts of 0.5 wt %, 3 wt % and 10 wt % in accordance with Example #3E;

FIG. 24 illustrates functions fitted to the lifetime decay measurements for each of the detection materials of Examples #3A to #3E;

FIG. 25 illustrates a system in accordance with a fourth embodiment of the present invention for determining the thermal history of a component which is subjected to a high-temperature environment;

FIG. 26 illustrates luminescence spectra measured at room temperature after excitation with a UV laser light source of a detection material, comprising a $Mg_4FGeO_6$ host doped with manganese (Mn) and a chromium (Cr) or nickel (Ni) modifier agent, where never having been subjected to a high-temperature environment and following exposure to temperatures of 800° C. and 900° C.;

FIG. 27 illustrates the intensity ratio for the intensity of the main emission line of a detection material, comprising a $Mg_4FGeO_6$ host doped with manganese (Mn) and a chromium (Cr) or nickel (Ni) modifier agent, following exposure to various temperatures when referenced to the intensity of the main emission line of the detection material when never having been subjected to any high-temperature environment; and FIG. 28 illustrates a representative plot of the life-time decay at room temperature of a detection material comprising a modifier agent and a host doped with a luminescent dopant as a function of the temperature to which the detection material has been exposed.

FIRST EMBODIMENT

Figure 1:
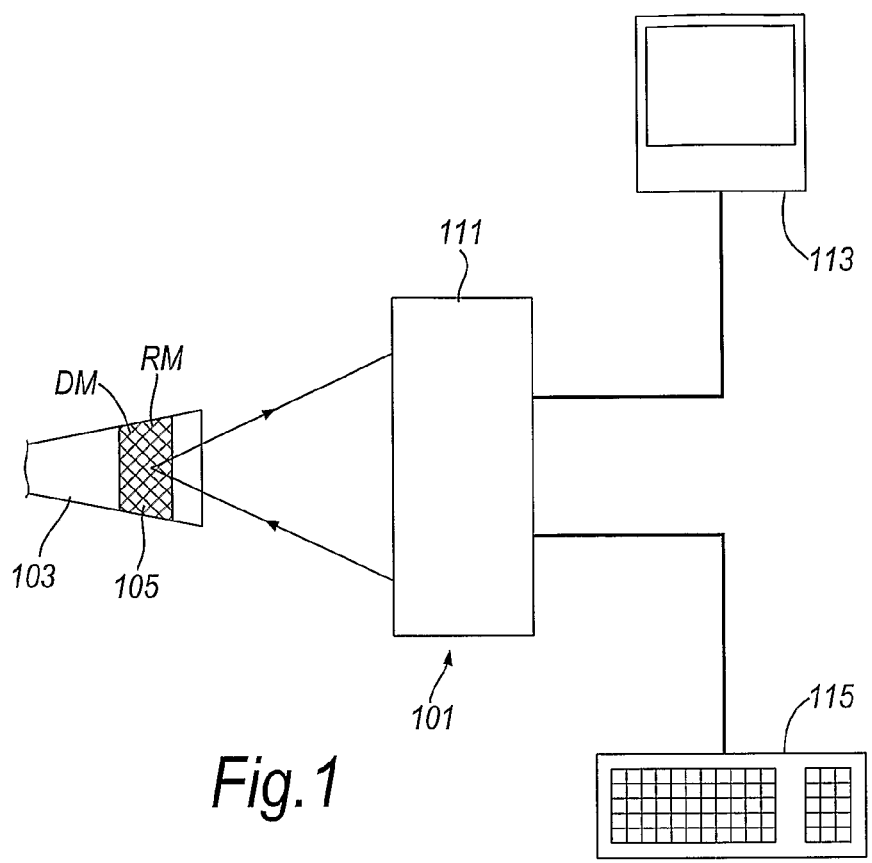
FIG. 1 illustrates a system in accordance with a first embodiment of the present invention for determining a thermal history of a component which is subjected to a high-temperature environment.

FIG. 1 illustrates a monitoring system 101 in accordance with a first embodiment of the present invention for determining a thermal history of a component 103 which is subjected to a high-temperature environment, such as turbine blades, boiler liners or parts of internal combustion engines.

The monitoring system 101 is operative to determine a thermal history of the component 103 by detecting luminescence spectra from a detection material DM and a reference material RM, in this embodiment applied to the component 103, here in a coating 105 on the component 103.

In this embodiment the coating 105 contains particles of the detection material DM and the reference material RM supported in a high-temperature binder, such as commercially-available binders from ZYP Coatings, Inc (Oak Ridge, Tenn., USA).

In one embodiment the coating 105 contains between about 1 wt % and about 90 wt % of the detection material DM and the reference material RM.

In one embodiment the coating 105 includes the detection material DM and the reference material RM in substantially equal amounts.

In one embodiment the particles of the detection material DM and the reference material RM are sized between about 10 nm and about 100 μm.

In an alternative embodiment the detection material DM and the reference material RM could be applied separately to the component 103, such as in separate coatings 105.

In this embodiment the monitoring system 101 is operative simultaneously to detect luminescence spectra from the detection material DM and the reference material RM, but in an alternative embodiment could detect the luminescence spectra separately.

In this embodiment the coating 105 is applied as a paint to the component 103, which can be applied by brush, spray or dipping.

In an alternative embodiment the coating 105 could be a structural coating, such as a thermal barrier coating (TBC).

The detection material DM comprises an amorphous host which is in an amorphous or glassy state, that is, in a fully-amorphous or partially-amorphous state and not in a fully-crystalline state, prior to being subjected to an operative environment, and in a preferred embodiment is initially in a fully-amorphous state, and is doped with at least one luminescent dopant, in this embodiment providing a phosphor.

When subjected to a high-temperature environment, the detection material DM transforms from the amorphous state to the crystalline state, which results in a change in the luminescence properties, including the luminescence spectrum and the lifetime decay, and this transformation depends on thermal history, which includes the temperature to which the component 103 has been subjected and the time at that temperature.

The detection material DM of this embodiment is particularly advantageous, in providing for an indication of the temperature to which the component 103 is subjected over a continuous range of temperature, and not just an indication of discrete thermal events in the manner of existing thermal paints.

In this embodiment the detection material DM comprises an amorphous aluminium oxide based host doped with at least one luminescent dopant.

In one embodiment the detection material DM comprises an amorphous yttrium aluminium oxide host.

In one embodiment the amorphous yttrium aluminium oxide host comprises yttrium aluminium garnet ($Y_3Al_5O_{12}$—YAG), yttrium aluminium monoclinic ($Y_4Al_2O_9$—YAM) or yttrium aluminium perovskite ($YAlO_3$—YAP), or mixtures thereof.

In one embodiment the at least one luminescent dopant is a rare earth, including at least one of La, Ce, Pr, Nd, Pm, Sm, Eu, Gd, Tb, Dy, Ho, Er, Tm, Yb and Lu.

When in an amorphous (not fully crystalline) state, the detection material DM shows broadened emission lines after excitation. For most dopants, the emission is usually in the visible or infrared region of the electromagnetic spectrum, but can be in the near UV region, such as for Gd and Tm. The excitation wavelength is usually in the UV region, but can be in the visible region, such as for Eu.

When the amorphous detection material DM is exposed to higher temperatures, the luminescence properties of the detection material DM change as a consequence of the transformation from the amorphous state to the crystalline state, in particular there are changes in intensity and spectral wavelength of the luminescence spectrum and the lifetime decay. This change continues until a fully-crystalline state is reached.

In another embodiment the host of the detection material DM could comprise amorphous gadolinium aluminium oxide.

In further embodiments the host of the detection material DM can be any material which has a high melting point and is chemically resistant, such as $Y_2O_3$, $ZrO_2$, $Al_2O_3$, $Si_3Ni_4$ and $ZrB_2$ or any modifications thereof, which can be provided in an amorphous or glassy state.

The reference material RM comprises a fully-crystalline host, which has a luminescence spectrum which is not influenced by a state transformation, in this embodiment chemically the same host as the host of the detection material DM, and is doped with at least one luminescent dopant, in this embodiment providing a phosphor.

As will be described in more detail hereinbelow, the reference material RM thus provides a reference calibration for external factors, such as viewing angle, polluted optics, unstable excitation sources and stray light, which could influence the intensity of the luminescence spectrum from the detection material DM.

By utilizing a fully-crystalline host for the reference material RN and with a different dopant than for the detection material DM, a temperature-independent intensity reading can be obtained which provides a datum for intensity readings from the detection material DM, as the luminescence spectrum from the reference material RM is not subject to structural transformation.

In this embodiment the reference material RM comprises a fully-crystalline aluminium oxide based host doped with at least one luminescent dopant.

In one embodiment the reference material RM comprises a fully crystalline yttrium aluminium oxide host.

In one embodiment the fully-crystalline yttrium aluminium oxide host comprises yttrium aluminium oxide ($Y_3Al_5O_{12}$—YAG), yttrium aluminium monoclinic ($Y_4Al_2O_9$—YAM) or yttrium aluminium perovskite ($YAlO_3$—YAP), or mixtures thereof.

In another embodiment the host of the reference material RM could comprise fully-crystalline gadolinium aluminium oxide.

In further embodiments the host of the reference material RM can be any material which has a high melting point and is chemically resistant, such as $Y_2O_3$, $ZrO_2$, $Al_2O_3$, $Si_3Ni_4$ and $ZrB_2$ or any modifications thereof, which can be provided in a stable crystalline state.

In one embodiment the at least one luminescent dopant is a rare earth, including at least one of La, Ce, Pr, Nd, Pm, Sm, Eu, Gd, Tb, Dy, Ho, Er, Tm, Yb and Lu.

In an alternative embodiment the detection material DM and the reference material RM could be incorporated within the body of the component 103, typically in the form of particles.

The monitoring system 101 includes a detector/processor 111 for detecting luminescence spectra from the detection material DM and the reference material RM and processing the detected luminescence characteristics, display means 113 for displaying information to an operator, and input means 115 for an operator to input information in operating the monitoring system 101.

In this embodiment the detector/processor 111 includes an opto-electronic detector, such as comprising a camera, a spectrometer or a photomultiplier device.

In this embodiment the monitoring system 101 determines a thermal history of the component 103 following subjection to a high-temperature environment from a ratio of the intensity of an emission line from the luminescence spectrum of the detection material DM and the intensity of an emission line from the luminescence spectrum from the reference material RM, at different wavelengths so that there is no interference between the emission lines, where the intensity ratio is used to determine the thermal history of the component 103, here from a look-up table or fitted to a curve.

In another embodiment the monitoring system 101 determines a thermal history of the component 103 following subjection to a high-temperature environment from the lifetime decay from the detection material DM, where the lifetime decay is used to determine the thermal history of the component 103, here from a look-up table or fitted to a curve.

In a further embodiment the monitoring system 101 could utilize the intensity ratio and lifetime decay in combination to determine a thermal history of the component 103 following subjection to a high-temperature environment, thereby providing increased sensitivity over an operative temperature range.

This embodiment of the present invention will now be described hereinbelow with reference to the following non-limiting Examples.

Example #1A

In this embodiment the detection material DM comprises an amorphous yttrium aluminium garnet (YAG) host doped with 3 wt % dysprosia ($Dy_2O_3$).

Figure 2:
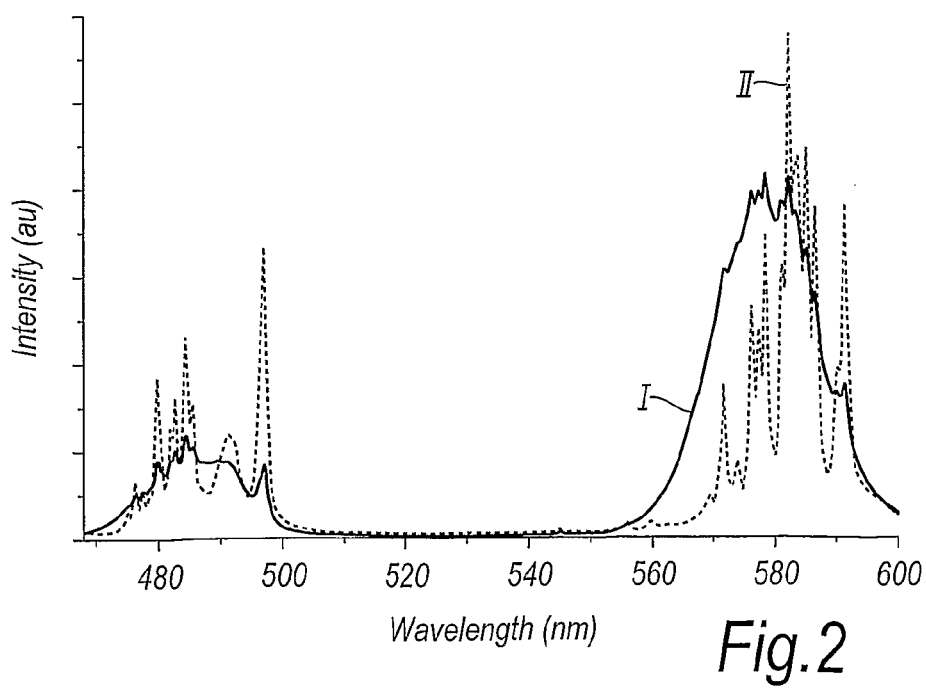
FIG. 2 illustrates luminescence spectra measured at room temperature after excitation with a UV laser light source at a wavelength of 355 nm of a detection material comprising an amorphous yttrium aluminium garnet (YAG) host doped with 3 wt % dysprosia ($Dy_2O_3$) in the amorphous and crystalline states.

FIG. 2 illustrates luminescence spectra measured at room temperature after excitation with a UV laser light source at a wavelength of 355 nm of the detection material DM in the amorphous state (Trace I—solid line), in which broad band emission is visible between about 470 nm and about 500 nm and about 550 nm and about 605 nm, and in the crystalline state (Trace II—dashed line), in which distinct emission lines are visible. The crystalline state is achieved by heating the amorphous detection material DM to a temperature above the crystallization temperature.

FIGS. 3(a) and (b) illustrate luminescence spectra measured at the various indicated temperatures after excitation with a UV laser light source at a wavelength of 355 nm of the detection material DM.

The luminescence spectra change continuously from a broad band emission spectrum to a sharp line emission spectrum during heating to higher temperatures. As can be seen, the change in intensity of the peak at a wavelength of about 580 nm is particularly marked, and a new emission line appears at a wavelength of about 540 nm.

FIG. 4 illustrates the intensity, here an integration of the intensity of the major emission band from 570 nm to 590 nm, at each temperature. It is remarkable that the intensity increases up to a temperature of about 475° C., before then decreasing until nearly approaching the crystallization temperature at about 910° C. The decrease in intensity ceases before the crystallisation temperature is reached, and then a significant increase in intensity can be observed, which is caused by the crystallisation of the detection material DM.

In this embodiment the reference material RM comprises fully-crystalline yttrium aluminium garnet (YAG) doped with 3 wt % thulia ($Tm_2O_3$) or 3 wt % europia ($Eu_2O_3$).

FIG. 5 illustrates a luminescence spectrum measured at room temperature after excitation with a UV laser light source at a wavelength of 355 nm of the reference material RM doped with Tm. As can be observed, the luminescence spectrum includes distinct emission lines in the region between about 440 nm and about 480 nm.

FIG. 6 illustrates a luminescence spectrum measured at room temperature after excitation with a UV laser light source at a wavelength of 266 nm of the reference material RM doped with Eu. As can be observed, the luminescence spectrum includes distinct emission lines in the region between about 580 nm and about 660 nm.

Example #1B

In this embodiment the component 103 comprises a stainless steel butterfly sample having a long wing, as illustrated in FIG. 7, and the detection material DM, applied as a coating 105 having a thickness of 60 µm by air plasma spraying (APS), comprises an amorphous yttrium aluminium garnet (YAG) host doped with 3 wt % dysprosia ($Dy_2O_3$).

In this embodiment the component 103 was aluminised to provide an aluminide layer, and heat treated to provide an alumina bondcoat, onto which the coating 105 was subsequently deposited.

The resulting sample was then heated in a Joule furnace, through the application of a current along the length of the long wing of component 103, such as to provide a thermal gradient along the length of the long wing of the component 103, with the hottest zone being at the neck of the component 103, and subsequently cooled to room temperature.

FIG. 7 illustrates the component 103 following heating. As can be observed, a distinctly-lighter region of higher reflectivity is visible extending to about 3.5 cm along the long wing from the neck of the component 103, with a distinct rounded front, reflecting the well-defined temperature profile along the length of the component 103. This lighter region is understood to represent crystallised YAG, with the crystallisation temperature being about 910° C.

FIG. 8(a) illustrates the lifetime decay at room temperature after excitation with a UV laser light source at a wavelength of 355 nm of the detection material DM at the indicated positions along the length of the long wing of the component 103.

In this embodiment the lifetime decay measurements were acquired from an average of fifteen pulses acquired using a photomultiplier tube, with the plotted values representing an average of five separate measurements. As illustrated in FIG. 8(b), the standard deviation is less than 1 μs over the entire measurement range, which provides a very high degree of accuracy. The deviation at the 7 cm measurement position is a measurement error attributed to an unidentified systematic measurement error.

As can be observed, there is a distinct transition in the lifetime decay profile at a position of about 3.5 cm, which corresponds exactly to the front of the visible lighter region, and is characteristic of the isothermal boundary at the crystallisation temperature of about 910° C. As will also be observed, the lifetime decay changes in a continuous fashion in the transition from the amorphous to crystalline state, in the direction from right to left along the long wing of the component 103. This contrasts with existing thermal paints, which only allow for the detection of discrete thermal events.

FIG. 9 illustrates representative luminescence spectra at room temperature after excitation with a UV laser light source at a wavelength of 355 nm from four positions along the long wing of the heat-treated component 103, with amorphous detection material DM (taken from two separate positions outside the crystalline region) being characterized by broad emission lines and crystalline detection material DM (taken from two separate positions within the crystalline region) being characterized by sharp emission lines.

As can be observed, the emission spectra for the crystalline material are substantially identical, whereas the emission spectra for the amorphous material differ, which represents a difference in the thermal history, here the temperature to which the component 103 has been subjected.

In this embodiment the intensity measurements were acquired from an average of ten spectra acquired using a linear diode array, with the plotted spectra representing an average of ten separate measurements.

FIG. 10 illustrates the intensity ratio at room temperature after excitation with a UV laser light source at a wavelength of 355 nm of the detection material DM at the indicated positions along the length of the long wing of the component 103 referenced to a reference material RM of identical composition in the crystalline state. In this embodiment the same dysprosia dopant can be utilized, as the luminescence spectra have been obtained from the detection material DM separately of the reference material RM.

As observed above in relation to the lifetime decay measurements, the intensity ratio shows a marked transition between the amorphous and crystalline regions, as represented at a position of about 3.5 cm along the long wing from the neck of the component 103, with a continuous increase in the intensity ratio as a function of temperature, as represented by the increasing temperature experienced by the component 103 in passing along the long wing to the neck of the component 103. In addition, the intensity ratio shows an increase at temperatures above the crystallisation temperature, as represented by the region from about 3.5 cm towards the neck of the component 103.

In one embodiment the lifetime decay and intensity ratio measurements can be used in combination where the measurements exhibit increased sensitivity over different temperature zones.

Example #1C

In this embodiment the detection material DM comprises an amorphous yttrium aluminium perovskite (YAP) host doped with 3 wt % terbia ($Tb_2O_3$), which was formed by co-precipitation.

Five samples of the detection material DM were heated at temperatures of 850, 900, 950, 1000 and 1100° C. in a box furnace and quenched to room temperature.

FIG. 11 illustrates the lifetime decay at room temperature after excitation with a UV laser light source at a wavelength of 266 nm for each of the samples of the detection material DM.

In this embodiment the lifetime decay measurements were acquired from an average of fifteen pulses acquired using a photomultiplier tube, with the plotted values representing an average of five separate measurements.

As can be observed, there is a distinct transition in the lifetime decay profile at the crystallisation temperature of about 910° C. As will also be observed, the lifetime decay changes in a continuous fashion as a function of temperature, showing a strong relationship between lifetime decay and the temperature to which the detection material DM has been subjected, allowing for a continuous characterization of temperature. As represented by the error bars, the statistical errors in the measurements are relatively small, allowing for accurate measurement.

Example #1D

In this embodiment the detection material DM comprises an amorphous yttrium aluminium monoclinic (YAM) host doped with 3 wt % terbia ($Tb_2O_3$), which was formed by co-precipitation.

Six samples of the detection material DM were heated at temperatures of 800, 850, 900, 950, 1000 and 1100° C. in a box furnace and quenched to room temperature.

FIG. 12 illustrates the lifetime decay at room temperature after excitation with a UV laser light source at a wavelength of 266 nm for each of the samples of the detection material DM.

In this embodiment the lifetime decay measurements were acquired from an average of fifteen pulses acquired using a photomultiplier tube, with the plotted values representing an average of five separate measurements.

As can be observed, there is a distinct transition in the lifetime decay profile at the crystallisation temperature of about 910° C. As will also be observed, the lifetime decay changes in a continuous fashion as a function of temperature, showing a strong relationship between lifetime decay and experienced temperature in the range of 950 to 1100° C., allowing for a continuous characterization of temperature.

Example #1E

In this embodiment the detection material DM comprises an amorphous yttrium aluminium garnet (YAG) host doped with 3 wt % dysprosia ($Dy_2O_3$), which was formed by air plasma spraying (APS).

Samples of the detection material DM were heated at various temperatures from room temperature to 1400° C. in a box furnace and quenched to room temperature.

FIG. 13 illustrates the intensity ratio at room temperature after excitation with a UV laser light source at a wavelength of 355 nm for each of the samples of the detection material DM referenced to a reference material RM of identical composition in the crystalline state. In this embodiment the same dysprosia dopant can be utilized, as the luminescence spectra have been obtained from the detection material DM separately of the reference material RM.

In this embodiment the intensity measurements were acquired from an average of ten spectra acquired using a linear diode array, with the plotted spectra representing an average of ten separate measurements.

As can be observed, there is a distinct transition in the lifetime decay profile at the crystallisation temperature of about 910° C. As will also be observed, the intensity ratio changes in a continuous fashion as a function of temperature, showing a strong relationship between lifetime decay and experienced temperature up to temperatures in excess of 1200° C., allowing for a continuous characterization of temperature.

Example #1F

In this embodiment the detection material DM comprises an amorphous yttrium aluminium perovskite (YAP) host doped with 3 wt % dysprosia ($Dy_2O_3$), which was formed by air plasma spraying (APS).

Samples of the detection material DM were heated at various temperatures from room temperature to 900° C. in a box furnace and quenched to room temperature.

FIG. 14 illustrates the intensity ratio at room temperature after excitation with a UV laser light source at a wavelength of 355 nm of each of the samples of the detection material DM referenced to a reference material RM comprising a crystalline yttrium aluminium garnet (YAG) host doped with 3 wt % dysprosia ($Dy_2O_3$). In this embodiment the same dysprosia dopant can be utilized, as the luminescence spectra are obtained from the detection material DM separately of the reference material RM.

In this embodiment the intensity measurements were acquired from an average of ten spectra acquired using a linear diode array, with the plotted spectra representing an average of ten separate measurements.

As can be observed, there is a distinct transition in the lifetime decay profile at the crystallisation temperature of about 900° C. As will also be observed, the intensity ratio changes in a continuous fashion as a function of temperature, showing a strong relationship between lifetime decay and experienced temperature, allowing for a continuous characterization of temperature.

It will be understood that quenching of the detection material DM is not a requirement of the present invention and is utilized only to illustrate the state transformation by exposure of the detection material DM to high-temperature environments.

SECOND EMBODIMENT

FIG. 15 illustrates a monitoring system 201 in accordance with a second embodiment of the present invention for determining a thermal history of a component 203 which is subjected to a high-temperature environment, such as turbine blades, boiler liners or parts of internal combustion engines.

The monitoring system 201 is operative to determine a thermal history of the component 203 by detecting the luminescence spectrum from a detection material DM, in this embodiment applied to the component 203, here in a coating 205 on the component 203.

In this embodiment the coating 205 contains particles of the detection material DM supported in a high-temperature binder, such as commercially-available binders from ZYP Coatings, Inc (Oak Ridge, Tenn., USA).

In one embodiment the coating 205 contains between about 1 wt % and about 90 wt % of the detection material DM.

In one embodiment the particles of the detection material DM are sized between about 10 nm and about 100 μm.

In this embodiment the coating 205 is applied as a paint to the component 203, which can be applied by brush, spray or dipping.

In an alternative embodiment the coating 205 could be a structural coating, such as a thermal barrier coating (TBC).

The detection material DM comprises a host which has a first stable state when having never been subjected to a temperature above a predetermined temperature and a second, different stable state once having been subjected to a temperature above the predetermined temperature, and at least one luminescent dopant, in this embodiment providing a phosphor. The luminescence spectra of the detection material DM is different in these different states, thus allowing for characterization, and thereby enabling determination of a thermal history of the component 203 when having been subjected to a temperature above the predetermined temperature.

In this embodiment the detection material DM comprises an oxysulphide host.

In a preferred embodiment the detection material DM comprises a $Y_2O_2S$ host, which has a first stable state when only exposed to temperatures below about 1000° C. and a second, different state when exposed to a temperature above 1000° C., doped with at least one luminescent dopant, thus allowing for characterization of the component 203 when having been subjected to a temperature above about 1000° C.

In one embodiment the at least one luminescent dopant is a rare earth, including at least one of La, Ce, Pr, Nd, Pm, Sm, Eu, Gd, Tb, Dy, Ho, Er, Tm, Yb and Lu.

The monitoring system 201 includes a detector/processor 211 for detecting luminescence spectra from the detection material DM and processing the detected luminescence characteristics, display means 213 for displaying information to an operator, and input means 215 for an operator to input information in operating the monitoring system 201.

In this embodiment the detector/processor 211 includes an opto-electronic detector, such as comprising a camera, a spectrometer, or a photomultiplier device.

In this embodiment the monitoring system 201 determines a thermal history of the component 203 by detecting for a predetermined characteristic change in the luminescence spectrum of the detection material DM, which is indicative of a thermal history in which the component 203 is subjected to a temperature above the predetermined characterizing temperature, in a preferred embodiment about 1000° C.

In an alternative embodiment the detection material DM could be incorporated within the body of the component 203, typically in the form of particles.

This embodiment of the present invention will now be described hereinbelow with reference to the following non-limiting Example.

Example #2

In this embodiment the detection material DM comprises a $Y_2O_2S$ host doped with 1 wt % samaria ($Sm_2O_3$).

FIG. 16 illustrates the luminescence spectrum measured at room temperature after excitation with a UV laser light source at a wavelength of 266 nm of the detection material DM when having never been exposed to a temperature above about 1000° C.

FIG. 17 illustrates the luminescence spectrum measured at room temperature after excitation with a YAG:Nd light source at a wavelength of 266 nm of the detection material DM when having been exposed to a temperature above about 1000° C.

As can be seen, the luminescence spectrum of the detection material DM following exposure to a temperature above 1000° C. is significantly different from the luminescence spectrum prior to exposure to a temperature above 1000° C., thereby enabling characterization of the state of the detection material DM, and hence enabling determination of a thermal history of the component 203.

THIRD EMBODIMENT

FIG. 18 illustrates a monitoring system 301 in accordance with a third embodiment of the present invention for determining a thermal history of a component 303 which is subjected to a high-temperature environment, such as turbine blades, boiler liners or parts of internal combustion engines.

The monitoring system 301 is operative to determine a thermal history of the component 303 by detecting the luminescence spectra from a detection material DM, which comprises a host and, separately, at least one luminescent dopant which functions to diffuse into the host when the component 303 is subjected to a high-temperature environment, and a reference material RM, in this embodiment applied to the component 303, here in a coating 305 on the component 303.

In this system, the luminescent dopant diffuses into the host at a rate which is related to the temperature to which the component 303 is subjected and the time at that temperature, and, with progressively increasing diffusion, the intensity of the peaks in the luminescence spectrum associated with the doped host increases with increased diffusion, thereby enabling a characterization of a thermal history of the component 303.

In this embodiment the coating 305 contains particles of the host and the at least one luminescent dopant of the detection material DM, here as mixed powders, and the reference material RM supported in a high-temperature binder, such as commercially-available binders from ZYP Coatings, Inc (Oak Ridge, Tenn., USA).

In one embodiment the coating 305 contains between about 1 and about 90 wt % of the detection material DM and the reference material RM.

In one embodiment the coating 305 includes the detection material DM and the reference material RM in substantially equal amounts.

In one embodiment the particles of the host of the detection material DM and the reference material RM are sized between about 10 nm and about 100 μm.

In an alternative embodiment the detection material DM and the reference material RM could be applied separately to the component 303, such as in separate coatings 305.

In this embodiment the monitoring system 301 is operative simultaneously to detect the luminescence spectra from the detection material DM and the reference material RM, but in an alternative embodiment could detect the luminescence spectra separately.

In this embodiment the coating 305 is applied as a paint to the component 303, which can be applied by brush, spray or dipping.

In an alternative embodiment the coating 305 could be a structural coating, such as a thermal barrier coating (TBC).

In this embodiment the detection material DM comprises an aluminium oxide based host doped with at least one luminescent dopant.

In one embodiment the detection material DM comprises an yttrium aluminium oxide host.

In one embodiment the yttrium aluminium oxide host comprises yttrium aluminium oxide ($Y_3Al_5O_{12}$—YAG), yttrium aluminium monoclinic ($Y_4Al_2O_9$—YAM) or yttrium aluminium perovskite ($YAlO_3$—YAP), or mixtures thereof.

In one embodiment the at least one luminescent dopant is a rare earth, including at least one of La, Ce, Pr, Nd, Pm, Sm, Eu, Gd, Tb, Dy, Ho, Er, Tm, Yb and Lu.

In another embodiment the host of the detection material could comprise gadolinium aluminium oxide.

In other embodiments the host of the detection material DM can be any material which has a high melting point and is chemically resistant, such as $Sr_4Al_{14}O_{25}$, $Mg_4FGeO_6$, $CeMgAl_{11}O_{19}$, $BaMgAl_{10}O_{17}$, $Ca_{10}(PO_4)_6$ (F, Cl)$_2$, (Sr, Mg)$_3$(PO$_4$)$_2$, $BaMgAl_{10}O_{17}$, $CeMgAl_{11}O_{19}$, $LaPO_4$, $Y_2O_3$, $Y_2O_2S$, $CeMgAl_{11}O_{19}$, $Zn_2SiO_4$, $Mg_4GeO_{5.5}F$, $SrB_4O_7$, $Sr_6BP_5O_{20}$, $Sr_4Al_{14}O_{25}$, $Gd(Zn, Mg)B_5O_{10}$, $Y_3Al_5{}^O{}_{12}$, $Y(V, P,B)O_4$, YSZ, $ZrO_2$, $Si_3Ni_4$, $ZrB_2$ and $Al_2O_3$ or any modifications or substitutions thereof.

The reference material RM comprises a stable crystalline host which is not influenced by a state transformation, in this embodiment chemically the same host as the host of the detection material DM, and is doped with at least one luminescent dopant, in this embodiment providing a phosphor, which is different to the luminescent dopant of the detection material DM.

As will be described in more detail hereinbelow, the reference material RM thus provides a reference calibration for external factors, such viewing angle, polluted optics, unstable excitation sources and stray light, which could influence the intensity of the luminescence spectrum from the detection material DM.

By utilizing a fully-crystalline host for the reference material RM and with a different dopant than for the detection material DM, a temperature-independent intensity reading is obtained which provides a datum for the intensity reading from the detection material DM, as the luminescence spectrum from the reference material RM is not subject to structural transformation.

In this embodiment the reference material RM comprises a fully-crystalline aluminium oxide based host doped with at least one luminescent dopant.

In one embodiment the reference material RM comprises a fully crystalline yttrium aluminium oxide host.

In one embodiment the fully-crystalline yttrium aluminium oxide host comprises yttrium aluminium oxide ($Y_3Al_5O_{12}$—YAG), yttrium aluminium monoclinic ($Y_4Al_2O_9$—YAM) or yttrium aluminium perovskite ($YAlO_3$—YAP), or mixtures thereof.

In another embodiment the host of the reference material RM could comprise fully-crystalline gadolinium aluminium oxide.

In further embodiments the host of the reference material RM can be any material which has a high melting point and is chemically resistant, such as $Y_2O_3$, $ZrO_2$, $Al_2O_3$, $Si_3Ni_4$ and $ZrB_2$ or any modifications thereof, which can be provided in a stable crystalline state.

In one embodiment the at least one luminescent dopant is a rare earth, including at least one of La, Ce, Pr, Nd, Pm, Sm, Eu, Gd, Tb, Dy, Ho, Er, Tm, Yb and Lu.

The monitoring system 301 includes a detector/processor 311 for detecting luminescence spectra from the detection material DM and the reference material RM and processing the detected luminescence characteristics, display means 313 for displaying information to an operator, and input means 315 for an operator to input information in operating the monitoring system 301.

In this embodiment the detector 311 includes an optoelectronic detector, such as comprising a camera, a spectrometer or a photomultiplier device.

In this embodiment the monitoring system 301 determines a thermal history of the component 303 following subjection to a high-temperature environment from a ratio of the intensity of an emission line from the luminescence spectrum of the detection material DM and the intensity of an emission line from the luminescence spectrum from the reference material RM, at different wavelengths so that there is no interference between the emission lines, where the intensity ratio is used to determine the thermal history of the component 303, here from a look-up table or by fitting to a curve.

In another embodiment the monitoring system 301 determines a thermal history of the component 303 following subjection to a high-temperature environment from the lifetime decay from the detection material DM, where the lifetime decay is used to determine the thermal history of the component 303, here from a look-up table or by fitting to a curve.

In one alternative embodiment the detection material DM could comprise coated particles, which comprise the host coated by the luminescent dopant, such that the dopant diffuses into the host core of the detection material DM when subjected to a high-temperature environment.

In another alternative embodiment the host of the detection material DM could be coated on particles of the luminescent dopant, such that the dopant diffuses into the host shell of the detection material DM when subjected to a high-temperature environment.

In still another alternative embodiment the detection material DM and the reference material RM could be incorporated within the body of the component 103, typically in the form of particles.

Example #3A

In this embodiment the detection material DM comprises an yttria stabilized zirconia (YSZ) host doped with differing levels of dysprosia ($Dy_2O_3$), here at concentrations of 0.3 mol %, 1 mol % and 2 mol %.

FIG. 19 illustrates the lifetime decay at room temperature after excitation with a UV laser light source at a wavelength of 355 nm for each of the samples of the detection material DM.

The lifetime decays were measured as 830 μs, 440 μs and 320 μs, and exhibit a functional relationship between dopant level and lifetime decay. This relationship allows for a determination of a thermal history to which the detection material DM has been subjected by characterization of the dopant level to the temperature and time at temperature.

In this embodiment the lifetime decay measurements were acquired from an average of fifteen pulses acquired using a photomultiplier tube, with the plotted values representing an average of five separate measurements.

Example #3B

In this embodiment the detection material DM comprises an yttria stabilized zirconia (YSZ) host doped with differing levels of samaria ($Sm_2O_3$), here at concentrations of 0.07 wt %, 0.7 wt % and 2.1 wt %.

FIG. 20 illustrates the lifetime decay at room temperature after excitation with a UV laser light source at a wavelength of 355 nm for each of the samples of the detection material DM.

The lifetime decays were measured as 682 μs, 158 μs and 91 μs, and exhibit a functional relationship between dopant level and lifetime decay. This relationship allows for a determination of a thermal history to which the detection material DM has been subjected by characterization of the dopant level to the temperature and time at temperature.

In this embodiment the lifetime decay measurements were acquired from an average of fifteen pulses acquired using a photomultiplier tube, with the plotted values representing an average of five separate measurements.

Example #3C

In this embodiment the detection material DM comprises an yttria stabilized zirconia (YSZ) host doped with differing levels of terbia ($Tb_2O_3$), here at concentrations of 0.07 wt %, 0.21 wt %, 0.35 wt % and 2.1 wt %.

FIG. 21 illustrates the lifetime decay at room temperature after excitation with a UV laser light source at a wavelength of 355 nm for each of the samples of the detection material DM.

The lifetime decays were measured as 2403 μs, 2211 μs, 1992 μs and 991 μs, and exhibit a functional relationship between dopant level and lifetime decay. This relationship allows for a determination of a thermal history to which the detection material DM has been subjected by characterization of the dopant level to the temperature and time at temperature.

In this embodiment the lifetime decay measurements were acquired from an average of fifteen pulses acquired using a photomultiplier tube, with the plotted values representing an average of five separate measurements.

Example #3D

In this embodiment the detection material DM comprises an yttria stabilized zirconia (YSZ) host doped with differing levels of europia ($Eu_2O_3$), here at concentrations of 0.007 wt %, 0.21 wt % and 2.1 wt %.

FIG. 22 illustrates the lifetime decay at room temperature after excitation with a UV laser light source at a wavelength of 355 nm for each of the samples of the detection material DM.

The lifetime decays were measured as 1993 μs, 1943 μs and 1026 μs, and exhibit a functional relationship between dopant level and lifetime decay. This relationship allows for a determination of a thermal history to which the detection material DM has been subjected by characterization of the dopant level to the temperature and time at temperature.

In this embodiment the lifetime decay measurements were acquired from an average of fifteen pulses acquired using a photomultiplier tube, with the plotted values representing an average of five separate measurements.

Example #3E

In this embodiment the detection material DM comprises an yttria aluminium garnet (YAG) host doped with differing levels of thulia ($Tm_2O_3$), here at concentrations of 0.5 wt %, 3 wt % and 10 wt %.

FIG. 23 illustrates the lifetime decay at room temperature after excitation with a UV laser light source at a wavelength of 355 nm for each of the samples of the detection material DM.

The lifetime decays were measured as 29 μs, 12 μs and 6 μs, and exhibit a functional relationship between dopant level and lifetime decay. This relationship allows for a determination of a thermal history to which the detection material DM has been subjected by characterization of the dopant level to the temperature and time at temperature.

In this embodiment the lifetime decay measurements were acquired from an average of fifteen pulses acquired using a photomultiplier tube, with the plotted values representing an average of five separate measurements.

As described above, the lifetime decays for the detection materials DM of Examples #3A to #3E each exhibit a functional relationship between dopant level and lifetime decay, which can be fitted by the equation:

$$\text{Decay time} = k/(m)^{0.5}$$

Where:
k is a material constant
m is the mole fraction

For the YSZ systems of Examples #3A to #3D, the material constants k are as follows:
k($Dy_2O_3$)=45.14 for m>0.051
k($Sm_2O_3$)=13.21 for m>0.004
k($Eu_2O_3$)=112.39 for m>0.32
k($Tb_2O_3$)=91.87 for m>0.21

FIG. 24 illustrates functions fitted to the lifetime decay measurements for each of the detection materials of Examples #3A to #3E.

FOURTH EMBODIMENT

FIG. 25 illustrates a monitoring system 401 in accordance with a fourth embodiment of the present invention for determining a thermal history of a component 403 which is subjected to a high-temperature environment, such as turbine blades, boiler liners or parts of internal combustion engines.

The monitoring system 401 is operative to determine a thermal history of the component 403 by detecting the luminescence spectra from a detection material DM, which comprises a host doped with a first luminescent dopant and, separately, a modifier agent which functions to diffuse into the host when the component 403 is subjected to a high-temperature environment and alter the luminescent properties of the luminescent dopant, either by quenching or sensitizing the luminescent dopant, and a reference material RM, which comprises a host doped with a second luminescent dopant which is different to the first luminescent dopant and not affected by the modifier agent, in this embodiment applied to the component 403, here in a coating 405 on the component 403.

In this system, the modifier agent diffuses into the host of the detection material DM at a rate which is related to the temperature and the time at temperature, and, with progressively increasing diffusion, the intensity of the peaks in the luminescence spectrum associated with the doped host alter with increased diffusion, thereby enabling a characterization of a thermal history of the component 403.

In one embodiment the modifier agent can be a quenching agent which is such as to decrease the intensity of the luminescence from the detection material DM.

In one embodiment the quenching agent can be the first luminescent dopant, which when contained in excess in the detection material DM diminishes the intensity of the luminescence from the detection material DM.

In another embodiment the quenching agent can be an additive, different to the first luminescent dopant, which diminishes or "kills" the luminescence from the detection material DM.

Exemplary detection materials DM and luminescent dopants, as phosphor materials, are as follows, where the rare earths (RE) include La, Ce, Pr, Nd, Pm, Sm, Eu, Gd, Tb, Dy, Ho, Er, Tm, Yb and Lu.

$Sr_4Al_{14}O_{25}$:RE, typically Eu
$Mg_4FGeO_6$:Mn or RE
$CeMgAl_{11}O_{19}$:RE, typically Tb
$BaMgAl_{10}O_{17}$:RE, typically Eu
$RE(PO_3)_2$, typically Eu
$Ca_{10}(PO_4)_6 (F,Cl)_2$:Sb, Mn or RE
$(Sr, Mg)_3(PO_4)_2$:Sn or RE
$BaMgAl_{10}O_{17}$:RE, typically Eu
$CeMgAl_{11}O_{19}$:RE, typically Tb
$LaPO_4$:RE, typically Ce and Tb
$Y_2O_3$:RE, typically Eu
$Y_2O_2S$:RE, typically Eu
$BaMgAl_{10}O_{17}$:RE, typically Eu
$CeMgAl_{11}O_{19}$:RE, typically Tb
$Zn_2SiO_4$:Mn or RE
$Mg_4GeO_{5.5}F$:Mn or RE
$SrB_4O_7$:RE, typically Eu
$Sr_6BP_5O_{20}$:RE, typically Eu
$Sr_4Al_{14}O_{25}$:RE, typically Eu
$Gd(Zn, Mg)B_5O_{10}$:RE, typically Ce
$Y_3Al_5O_{12}$:RE, typically Ce
$Y(V,P,B)O_4$:RE, typically Eu
YSZ:RE, typically Eu
$Al_2O_3$:Cr or RE
$REAl_3B_4O_{12}$, typically Eu Exemplary quenching agents for such a system include:
Rare earths (REs), including La, Ce, Pr, Nd, Pm, Sm, Eu, Gd, Tb, Dy, Ho, Er, Tm, Yb and Lu.
Transition Metals, including Cr, Mn, Fe, Co, Ni, Hf and Mo.

In another embodiment the modifier agent can be a sensitizer agent which is such as to increase the intensity of the luminescence from the detection material DM.

In one embodiment the sensitizer agent can be a sensitizer ion, which acts to increase the sensitivity of the first luminescent dopant of the detection material DM.

One example system is a $Tb^{3+}$ based phosphor, which is sensitized by $Ce^{3+}$ ions.

In this embodiment the coating 405 contains particles of the doped host and the modifier agent of the detection material DM, here as mixed powders, and the reference material RM supported in a high-temperature binder, such as commercially-available binders from ZYP Coatings, Inc (Oak Ridge, Tenn., USA).

In one embodiment the coating 405 contains between about 1 and about 90 wt % of the detection material DM and the reference material RM.

In one embodiment the coating 405 includes the detection material DM and the reference material RM in substantially equal amounts.

In one embodiment the particles of the host of the detection material DM and the reference material RM are sized between about 10 nm and about 100 μm.

In an alternative embodiment the detection material DM and the reference material RM could be applied separately to the component 403, such as in separate coatings 405.

In this embodiment the monitoring system 401 is operative simultaneously to detect the luminescence spectra from the detection material DM and the reference material RM, but in an alternative embodiment could detect the luminescence spectra separately.

In this embodiment the coating 405 is applied as a paint to the component 403, which can be applied by brush, spray or dipping.

In an alternative embodiment the coating 405 could be a structural coating, such as a thermal barrier coating (TBC).

The reference material RM comprises a stable crystalline host which is not influenced by a state transformation, in this embodiment chemically the same host as the host of the detection material DM, and is doped with a luminescent dopant, in this embodiment providing a phosphor, which is different to the luminescent dopant of the detection material DM and selected so as not to be effected by the modifier agent.

As will be described in more detail hereinbelow, the reference material RM thus provides a reference calibration for external factors, such viewing angle, polluted optics, unstable excitation sources and stray light, which could influence the intensity of the luminescence spectrum from the detection material DM.

By utilizing a fully-crystallised host for the reference material RM and with a different dopant than for the detection material DM, a temperature-independent intensity reading is obtained which provides a datum for the intensity reading from the detection material DM, as the luminescence spectrum from the reference material RM is not subject to structural transformation.

The monitoring system 401 includes a detector/processor 411 for detecting luminescence spectra from the detection material DM and the reference material RM and processing the detected luminescence characteristics, display means 413 for displaying information to an operator, and input means 415 for an operator to input information in operating the monitoring system 401.

In this embodiment the detector 411 includes an opto-electronic detector, such as comprising a camera, a spectrometer or a photomultiplier device.

In this embodiment the monitoring system 401 determines a thermal history of the component 403 following subjection to a high-temperature environment from a ratio of the intensity of an emission line from the luminescence spectrum of the detection material DM and the intensity of an emission line from the luminescence spectrum of the reference material RM, at different wavelengths so that there is no interference between the emission lines, where the intensity ratio is used to determine the thermal history of the component 403, here from a look-up table or by fitting to a curve.

Example #4

In this embodiment the detection material DM comprises a $Mg_4FGeO_6$ host doped with manganese (Mn), in the form of a powder, and one of chromium (Cr) or nickel (Ni), here in the form of an oxide powder, as the modifier agent, here a quenching agent.

FIG. 26 illustrates luminescence spectra measured at room temperature after excitation with a UV laser light source of the detection material DM where never having been subjected to a high-temperature environment and following exposure to temperatures of 800° C. and 900° C.

As can be clearly observed, the intensity of the main emission lines decreases markedly with exposure to increasing temperatures, as a result of the quenching effect of the quenching agent, which diffuses into the host of the detection material DM and quenches the luminescence of the luminescent dopant.

This temperature effect on the room-temperature luminescence spectrum of the detection material DM is clearly represented in FIG. 27, which illustrates the intensity ratio for the intensity of the main emission line of the detection material DM following exposure to various temperatures when referenced to the intensity of the main emission line of the detection material DM when never having been subjected to any high-temperature environment. This plot of intensity ratio shows a marked transition following exposure of the detection material to temperatures in the range of about 750° C. to about 900° C.

In an alternative embodiment the monitoring system 401 of this embodiment can be modified to determine a temperature history from the lifetime decay from the phosphor provided by the detection material DM, instead of from measured intensities.

In measuring the life-time decay, the phosphor is excited with a short laser pulse, and the decay in the luminescence intensity measured. Typical decay times are between about 15 ns and 5 ms.

It has been observed by the present inventors that the life-time decay is sensitive to the function of the modifier agent, in markedly altering the lifetime decay of the phosphor following exposure to high-temperature environments. A representative plot of the life-time decay is illustrated in FIG. 28, where the life-time decay reduces significantly following exposure of the component 403 to a temperature above a predetermined temperature and the lifetime decay is sensitive to exposure to temperatures above this temperature. In this way, with a pre-calibrated look-up table, the temperature exposure of the component 403 above this temperature can be determined by reference to the life-time decay.

A particular advantage of determining temperature history from the lifetime decay is that the lifetime decay describes a temporal effect, which provides for an accurate measurement without reference to a datum, and thus allows for characterization even when the observation may be obstructed, for example, by dirt, deposits or combustion products.

Finally, it will be understood that the present invention has been described in its preferred embodiments and can be modified in many different ways without departing from the scope of the invention as defined by the appended claims.

In described embodiments the coatings 105, 205, 305, 405 are applied as paints which incorporate a chemical binder, but in alternative embodiments the coatings 105, 205, 305, 405 could be applied directly using physical coating techniques which do not require the use of a chemical binder, such as by plasma spraying, for example, air plasma spraying (APS), physical vapor deposition (PVD), for example, electron beam physical vapor deposition (EBPVD), and sputtering. These physical coating techniques can provide for improved adherence, optionally with the use of a bondcoat, such as employed in thermal barrier coatings (TBCs).

Also, in the described embodiments the illumination source is a UV laser, but could be any other UV light source, such as a UV lamp or a UV LED, or alternatively could be any shorter wavelength light source.

Further, in the described embodiments, the luminescent dopants are introduced as oxides, but the luminescent dopants could be introduced in any suitable vehicle, typically a compound form of the dopant metal, for example, as fluorides or sulphides.

The invention claimed is:

1. A method of determining a thermal history of a component which is subjected to an operative, thermal environment, the method comprising the steps of:
   providing a detection material to a component, wherein the detection material comprises an amorphous host which is in an amorphous or glassy state prior to exposure to an operative, thermal environment and doped with at least one luminescent dopant;
   exposing the component to an operative, thermal environment;
   measuring at least one luminescence characteristic of the detection material following exposure of the component to the operative environment, wherein the at least one luminescence characteristic is a function of the crystallization of the amorphous host of the detection material and the exposure of the component to the operative environment; and
   determining a thermal history of the component from the measured at least one luminescence characteristic of the detection material.

2. The method of claim 1, wherein the detection material is provided in a coating applied to the component.

3. The method of claim 2, wherein the coating is a paint or a structural coating.

4. The method of claim 2, wherein the coating is a thermal barrier coating (TBC).

5. The method of claim 1, wherein the detection material is provided within a body of the component.

6. The method of claim 1, wherein the amorphous host of the detection material is in a fully-amorphous state prior to exposure to the operative environment.

7. The method of claim 1, wherein the amorphous host of the detection material comprises an amorphous aluminium oxide based host.

8. The method of claim 1, wherein the amorphous host of the detection material comprises $Y_2O_3$, $ZrO_2$, $Al_2O_3$, $Si_3Ni_4$ or $ZrB_2$ based materials in an amorphous or glassy state.

9. The method of claim 1, wherein the detection material comprises from about 0.01 wt % to about 40 wt % of the at least one luminescent dopant.

10. The method of claim 1, wherein the at least one luminescent dopant of the detection material is a rare earth dopant.

11. The method of claim 1, wherein the at least one luminescence characteristic of the detection material is (i) an intensity of at least one emission line in a measured luminescence spectrum, (ii) a lifetime decay, or (iii) an intensity of at least one emission line in a measured luminescence spectrum and a lifetime decay.

12. The method of claim 1, wherein the at least one luminescence characteristic of the detection material is measured at room temperature.

13. The method of claim 1, wherein a reference material is provided to the component, the reference material comprising a host which is doped with at least one luminescent dopant different to that of the detection material, and a luminescence characteristic of the reference material is measured following exposure of the component to the operative environment, the luminescence characteristic of the reference material being used as a datum to the measured at least one luminescence characteristic of the detection material in determining a thermal history of the component.

14. The method of claim 13, wherein the detection material and the reference material are provided in a coating.

15. The method of claim 14, wherein the coating is a paint or a structural coating.

16. The method of claim 14, wherein the coating is a thermal barrier coating (TBC).

17. The method of claim 13, wherein the detection material and the reference material are provided within a body of the component.

18. The method of claim 13, wherein the luminescence characteristic of the reference material is measured at room temperature.

19. The method of claim 13, wherein the host of the reference material is in a fully-crystalline state prior to exposure to the operative environment.

20. The method of claim 13, wherein the luminescence characteristic of the reference material is an intensity of at least one emission line in a measured luminescence spectrum.

21. The method of claim 1, wherein the operative environment is a high-temperature environment.

22. The method of claim 1, wherein the amorphous host of the detection material comprises yttrium aluminium garnet (YAG), yttrium aluminium monoclinic (YAM), yttrium aluminium perovskite (YAP) or mixtures thereof.

23. The method of claim 1, wherein the amorphous host of the detection material comprises an amorphous gadolinium aluminium oxide host.

24. The method of claim 1, wherein the amorphous host of the detection material comprises gadolinium aluminium garnet (GAG), gadolinium aluminium monoclinic (GAM), gadolinium aluminium perovskite (GAP) or mixtures thereof.

25. The method of claim 1, wherein the detection material comprises from about 1 wt % to about 10 wt % of the at least one luminescent dopant.

26. The method of claim 1, wherein the detection material comprises from about 1 wt % to about 5 wt % of the at least one luminescent dopant.

27. The method of claim 1, wherein the detection material comprises from about 0.01 wt % to about 5 wt % of the at least one luminescent dopant.

28. The method of claim 1, wherein the at least one luminescent dopant of the detection material is a rare earth selected from La, Ce, Pr, Nd, Pm, Sm, Eu, Gd, Tb, Dy, Ho, Er, Tm, Yb and Lu.

29. A system for determining a thermal history of a component to which is provided a detection material and which is in use subjected to an operative, thermal environment, wherein the detection material comprises an amorphous host which is in an amorphous or glassy state prior to exposure to the operative environment and doped with at least one luminescent dopant, the system comprising:
   a detector for measuring at least one luminescence characteristic of the detection material following exposure of the component to the operative environment, wherein the at least one luminescence characteristic is a function of the crystallization of the amorphous host of the detection material and the exposure of the component to the operative environment; and
   a processor for determining a thermal history of the component from the measured at least one luminescence characteristic of the detection material.

30. The system of claim 29, wherein the amorphous host of the detection material is in a fully-amorphous state prior to exposure to the operative environment.

31. The system of claim 29, wherein the at least one luminescence characteristic of the detection material is (i) an intensity of at least one emission line in a measured luminescence spectrum, (ii) a lifetime decay, or (iii) an intensity of at least one emission line in a measured luminescence spectrum and a lifetime decay.

32. The system of claim 29, wherein the at least one luminescence characteristic of the detection material is measured at room temperature.

33. The system of claim 29, wherein a reference material is provided to the component, the reference material comprising a host which is doped with at least one luminescent dopant different to that of the detection material, and the detector measures a luminescence characteristic of the reference material following exposure of the component to the operative environment, the luminescence characteristic of the reference material being used as a datum to the measured at least one luminescence characteristic of the detection material in determining a thermal history of the component.

34. The system of claim 33, wherein the luminescence characteristic of the reference material is an intensity of at least one emission line in a measured luminescence spectrum.

35. The system of claim 33, wherein the luminescence characteristic of the reference material is measured at room temperature.

* * * * *